US008331643B2

(12) United States Patent
Yacoubian et al.

(10) Patent No.: US 8,331,643 B2
(45) Date of Patent: Dec. 11, 2012

(54) CURRENCY BILL SENSOR ARRANGEMENT

(75) Inventors: Araz Yacoubian, Carlsbad, CA (US); Tomasz M. Jagielinski, Carlsbad, CA (US)

(73) Assignee: Cummins-Allison Corp., Mt. Prospect, IL (US)

( * ) Notice: Subject to any disclaimer, the term of this patent is extended or adjusted under 35 U.S.C. 154(b) by 1181 days.

(21) Appl. No.: 12/175,307

(22) Filed: Jul. 17, 2008

(65) Prior Publication Data

US 2009/0022390 A1 Jan. 22, 2009

Related U.S. Application Data

(60) Provisional application No. 60/950,263, filed on Jul. 17, 2007.

(51) Int. Cl.
*G06K 9/00* (2006.01)

(52) U.S. Cl. ........................................ 382/135

(58) Field of Classification Search .................. 382/100, 382/135–140; 194/4–6; 209/534–537; 235/379–384; 250/200–205; 356/71–77; 902/7–11

See application file for complete search history.

(56) References Cited

U.S. PATENT DOCUMENTS

| | | | | |
|---|---|---|---|---|
| 3,208,974 | A | 9/1965 | Roberts | 260/67 |
| 3,480,785 | A | 11/1969 | Aufderheide | 250/219 |
| 3,496,370 | A | 2/1970 | Haville et al. | 250/219 |
| 4,334,619 | A | 6/1982 | Horino et al. | 209/551 |
| 4,542,829 | A | 9/1985 | Emery et al. | 209/534 |
| 4,544,266 | A | 10/1985 | Antes | 356/71 |
| 4,559,451 | A | 12/1985 | Curl | 250/560 |
| 4,585,928 | A | 4/1986 | Watanabe | 235/379 |
| 4,587,434 | A | 5/1986 | Roes et al. | 250/556 |
| 4,650,320 | A | 3/1987 | Chapman et al. | 356/71 |
| 4,658,289 | A | 4/1987 | Nagano et al. | 358/75 |
| 4,716,456 | A | 12/1987 | Hosaka | 358/75 |

(Continued)

FOREIGN PATENT DOCUMENTS

EP 0 718 809 B1 3/2000

(Continued)

*Primary Examiner* — Atiba O Fitzpatrick
(74) *Attorney, Agent, or Firm* — Nixon Peabody LLP

(57) ABSTRACT

A currency processing device for receiving a stack of U.S. currency bills and rapidly processing all the bills in the stack, the device comprising: an input receptacle adapted to receive a stack of U.S. currency bills of a plurality of denominations, the currency bills having a wide dimension and a narrow dimension; a transport mechanism positioned to transport the bills, one at a time, in a transport direction from the input receptacle along a transport path at a rate of at least about 1000 bills per minute with the narrow dimension of the bills parallel to the transport direction; a currency bill sensor arrangement positioned along the transport path, the currency bill sensor comprising: i) a multi-wavelength light source configured to emit a first wavelength of light and a second wavelength of light; ii) a cylindrical lens positioned to receive the first and second wavelengths of light from the multi-wavelength light source, the cylindrical lens illuminating an elongated strip of light on a surface of one of the plurality of currency bills, the cylindrical lens being configured to receive light reflected from the surface of the one of the plurality of currency bills; iii) a photodetector positioned to receive the reflected light, the photodetector generating an electrical signal in response to the received reflected light; iv) a processor configured to receive the electrical signal generated by the photodetector; wherein, the processor is configured to determine whether the surface of the one of the plurality of currency bills is a primary surface or a secondary surface based on the electrical signal.

30 Claims, 12 Drawing Sheets

U.S. PATENT DOCUMENTS

| | | | | |
|---|---|---|---|---|
| 4,825,246 | A | 4/1989 | Fukuchi et al. | 355/4 |
| 4,841,358 | A | 6/1989 | Kammoto et al. | 358/75 |
| 4,881,268 | A | 11/1989 | Uchida et al. | 382/7 |
| 4,908,516 | A | 3/1990 | West | 250/556 |
| 5,163,672 | A | 11/1992 | Mennie | 271/187 |
| 5,207,788 | A | 5/1993 | Geib | 271/122 |
| 5,295,196 | A | 3/1994 | Raterman et al. | 382/135 |
| 5,467,405 | A | 11/1995 | Raterman et al. | 382/135 |
| 5,467,406 | A | 11/1995 | Graves et al. | 382/135 |
| D369,984 | S | 5/1996 | Larsen | D10/97 |
| 5,523,575 | A | 6/1996 | Machida et al. | 250/208.1 |
| 5,633,949 | A | 5/1997 | Graves et al. | 382/135 |
| 5,640,463 | A | 6/1997 | Csulits | 382/135 |
| 5,652,802 | A | 7/1997 | Graves et al. | 382/135 |
| 5,687,963 | A | 11/1997 | Mennie | 271/119 |
| 5,692,067 | A | 11/1997 | Raterman et al. | 382/135 |
| 5,704,491 | A | 1/1998 | Graves | 209/534 |
| 5,724,438 | A | 3/1998 | Graves | 382/135 |
| 5,751,840 | A | 5/1998 | Raterman et al. | 382/135 |
| 5,790,693 | A | 8/1998 | Graves et al. | 382/135 |
| 5,790,697 | A | 8/1998 | Munro et al. | 382/135 |
| 5,806,650 | A | 9/1998 | Mennie et al. | 194/206 |
| 5,815,592 | A | 9/1998 | Mennie et al. | 382/135 |
| 5,822,448 | A | 10/1998 | Graves et al. | 382/135 |
| 5,832,104 | A | 11/1998 | Graves et al. | 382/135 |
| 5,867,589 | A | 2/1999 | Graves et al. | 382/135 |
| 5,870,487 | A | 2/1999 | Graves et al. | 382/135 |
| 5,875,259 | A | 2/1999 | Mennie et al. | 382/135 |
| 5,905,810 | A | 5/1999 | Jones et al. | 382/135 |
| 5,909,502 | A | 6/1999 | Mazur | 382/135 |
| 5,909,503 | A | 6/1999 | Graves et al. | 382/135 |
| 5,912,982 | A | 6/1999 | Munro et al. | 382/135 |
| 5,938,044 | A | 8/1999 | Weggesser | 209/534 |
| 5,943,655 | A | 8/1999 | Jacobsen | 705/30 |
| 5,960,103 | A | 9/1999 | Graves et al. | 382/135 |
| 5,966,456 | A | 10/1999 | Jones et al. | 382/135 |
| 5,982,918 | A | 11/1999 | Mennie et al. | 382/135 |
| 5,992,601 | A | 11/1999 | Mennie et al. | 194/207 |
| 6,012,565 | A | 1/2000 | Mazur | 194/207 |
| 6,021,883 | A | 2/2000 | Casanova et al. | 194/217 |
| 6,026,175 | A | 2/2000 | Munro et al. | 382/135 |
| 6,028,951 | A | 2/2000 | Raterman et al. | 382/135 |
| 6,068,194 | A | 5/2000 | Mazur | 235/492 |
| 6,072,896 | A | 6/2000 | Graves et al. | 382/135 |
| 6,073,744 | A | 6/2000 | Raterman et al. | 194/207 |
| 6,074,334 | A | 6/2000 | Mennie et al. | 493/438 |
| 6,128,402 | A | 10/2000 | Jones et al. | 382/135 |
| 6,220,419 | B1 | 4/2001 | Mennie | 194/207 |
| 6,237,739 | B1 | 5/2001 | Mazur et al. | 194/207 |
| 6,241,069 | B1 | 6/2001 | Mazur et al. | 194/207 |
| 6,256,407 | B1 | 7/2001 | Mennie et al. | 382/135 |
| 6,278,795 | B1 | 8/2001 | Anderson et al. | 382/135 |
| 6,311,819 | B1 | 11/2001 | Stromme et al. | 194/207 |
| 6,318,537 | B1 | 11/2001 | Jones et al. | 194/346 |
| 6,351,551 | B1 | 2/2002 | Munro et al. | 382/135 |
| 6,363,164 | B1 | 3/2002 | Jones et al. | 382/135 |
| 6,371,303 | B1 | 4/2002 | Klein et al. | 209/534 |
| 6,378,683 | B2 | 4/2002 | Mennie | 194/207 |
| 6,381,354 | B1 | 4/2002 | Mennie et al. | 382/135 |
| 6,398,000 | B1 | 6/2002 | Jenrick et al. | 194/200 |
| 6,459,806 | B1 | 10/2002 | Raterman et al. | 382/135 |
| 6,460,705 | B1 | 10/2002 | Hallowell | 209/534 |
| 6,493,461 | B1 | 12/2002 | Mennie et al. | 382/135 |
| 6,539,104 | B1 | 3/2003 | Raterman et al. | 382/135 |
| 6,560,355 | B2 | 5/2003 | Graves et al. | 382/135 |
| 6,588,569 | B1 | 7/2003 | Jenrick et al. | 194/206 |
| 6,601,687 | B1 | 8/2003 | Jenrick et al. | 194/206 |
| 6,603,872 | B2 | 8/2003 | Jones et al. | 382/135 |
| 6,621,919 | B2 | 9/2003 | Mennie et al. | 382/135 |
| 6,628,816 | B2 | 9/2003 | Mennie et al. | 382/135 |
| 6,636,624 | B2 | 10/2003 | Raterman et al. | 382/135 |
| 6,647,136 | B2 | 11/2003 | Jones et al. | 382/137 |
| 6,650,767 | B2 | 11/2003 | Jones et al. | 382/135 |
| 6,654,486 | B2 | 11/2003 | Jones et al. | 382/135 |
| 6,661,910 | B2 | 12/2003 | Jones et al. | 382/135 |
| 6,665,431 | B2 | 12/2003 | Jones et al. | 382/135 |
| 6,678,401 | B2 | 1/2004 | Jones et al. | 382/135 |
| 6,678,402 | B2 | 1/2004 | Jones et al. | 382/135 |
| 6,705,470 | B2 | 3/2004 | Klein et al. | 209/534 |
| 6,721,442 | B1 | 4/2004 | Mennie et al. | 382/135 |
| 6,724,926 | B2 | 4/2004 | Jones et al. | 382/135 |
| 6,724,927 | B2 | 4/2004 | Jones et al. | 382/135 |
| 6,731,785 | B1 | 5/2004 | Mennie et al. | 382/135 |
| 6,731,786 | B2 | 5/2004 | Jones et al. | 382/135 |
| 6,748,101 | B1 | 6/2004 | Jones et al. | 382/135 |
| 6,778,693 | B2 | 8/2004 | Jones et al. | 382/135 |
| 6,798,899 | B2 | 9/2004 | Mennie et al. | 382/135 |
| 6,810,137 | B2 | 10/2004 | Jones et al. | 382/135 |
| 6,843,418 | B2 | 1/2005 | Jones et al. | 235/462.01 |
| 6,860,375 | B2 | 3/2005 | Hallowell et al. | 194/328 |
| 6,866,134 | B2 | 3/2005 | Stromme et al. | 194/207 |
| 6,868,954 | B2 | 3/2005 | Stromme et al. | 194/207 |
| 6,880,692 | B1 | 4/2005 | Mazur et al. | 194/207 |
| 6,913,130 | B1 | 7/2005 | Mazur et al. | 194/207 |
| 6,913,260 | B2 | 7/2005 | Maier et al. | 271/265.04 |
| 6,915,893 | B2 | 7/2005 | Mennie | 194/207 |
| 6,929,109 | B1 | 8/2005 | Klein et al. | 194/206 |
| 6,955,253 | B1 | 10/2005 | Mazur et al. | 194/207 |
| 6,957,733 | B2 | 10/2005 | Mazur et al. | 194/215 |
| 6,959,800 | B1 | 11/2005 | Mazur et al. | 194/207 |
| 6,962,247 | B2 | 11/2005 | Maier et al. | 194/207 |
| 6,980,684 | B1 | 12/2005 | Munro et al. | 382/135 |
| 6,994,200 | B2 | 2/2006 | Jenrick et al. | 194/206 |
| 6,996,263 | B2 | 2/2006 | Jones et al. | 382/135 |
| 7,000,828 | B2 | 2/2006 | Jones | 235/379 |
| 7,016,767 | B2 | 3/2006 | Jones et al. | 700/224 |
| 7,082,216 | B2 | 7/2006 | Jones et al. | 382/137 |
| 7,092,560 | B2 | 8/2006 | Jones et al. | 382/135 |
| 7,103,206 | B2 | 9/2006 | Graves et al. | 382/135 |
| 7,103,438 | B2 | 9/2006 | Hallowell et al. | 700/116 |
| 7,146,245 | B2 | 12/2006 | Jones et al. | 700/224 |
| 7,149,336 | B2 | 12/2006 | Jones et al. | 382/135 |
| 7,158,662 | B2 | 1/2007 | Chiles | 382/135 |
| 7,171,032 | B2 | 1/2007 | Jones et al. | 382/135 |
| 7,187,795 | B2 | 3/2007 | Jones et al. | 382/135 |
| 7,191,657 | B2 | 3/2007 | Maier et al. | 73/587 |
| 7,197,173 | B2 | 3/2007 | Jones et al. | 382/135 |
| 7,200,255 | B2 | 4/2007 | Jones et al. | 382/135 |
| 7,201,320 | B2 | 4/2007 | Csulits et al. | 235/462.01 |
| 7,232,024 | B2 | 6/2007 | Mazur et al. | 194/207 |
| 7,248,731 | B2 | 7/2007 | Raterman et al. | 382/135 |
| 7,256,874 | B2 | 8/2007 | Csulits et al. | 356/71 |
| 7,269,279 | B2 | 9/2007 | Chiles | 382/135 |
| 7,349,566 | B2 | 3/2008 | Jones et al. | 382/139 |
| 7,362,891 | B2 | 4/2008 | Jones et al. | 382/135 |
| 7,366,338 | B2 | 4/2008 | Jones et al. | 382/135 |
| 7,391,897 | B2 | 6/2008 | Jones et al. | 382/135 |
| 2001/0006557 | A1 | 7/2001 | Mennie et al. | 382/135 |
| 2001/0015311 | A1 | 8/2001 | Mennie | 194/207 |
| 2001/0019624 | A1 | 9/2001 | Raterman et al. | 382/135 |
| 2001/0035603 | A1 | 11/2001 | Graves et al. | 271/265.01 |
| 2002/0001393 | A1 | 1/2002 | Jones et al. | 382/100 |
| 2002/0020603 | A1 | 2/2002 | Jones et al. | 194/346 |
| 2002/0056605 | A1 | 5/2002 | Mazur et al. | 194/207 |
| 2002/0085245 | A1 | 7/2002 | Mennie et al. | 358/498 |
| 2002/0085745 | A1 | 7/2002 | Jones et al. | 382/135 |
| 2002/0103757 | A1 | 8/2002 | Jones et al. | 705/45 |
| 2002/0104785 | A1 | 8/2002 | Klein et al. | 209/534 |
| 2002/0107801 | A1 | 8/2002 | Jones et al. | 705/45 |
| 2002/0118871 | A1 | 8/2002 | Jones et al. | 382/137 |
| 2002/0122580 | A1 | 9/2002 | Jones et al. | 382/137 |
| 2002/0126885 | A1 | 9/2002 | Mennie et al. | 382/135 |
| 2002/0126886 | A1 | 9/2002 | Jones et al. | 382/135 |
| 2002/0131630 | A1 | 9/2002 | Jones et al. | 382/137 |
| 2002/0136442 | A1 | 9/2002 | Jones et al. | 382/135 |
| 2002/0145035 | A1 | 10/2002 | Jones | 235/379 |
| 2002/0154804 | A1 | 10/2002 | Jones et al. | 382/135 |
| 2002/0154805 | A1 | 10/2002 | Jones et al. | 382/135 |
| 2002/0154806 | A1 | 10/2002 | Jones et al. | 382/135 |
| 2002/0154807 | A1 | 10/2002 | Jones et al. | 382/135 |
| 2002/0154808 | A1 | 10/2002 | Jones et al. | 382/135 |
| 2002/0186876 | A1 | 12/2002 | Jones et al. | 382/135 |
| 2003/0009420 | A1 | 1/2003 | Jones | 705/39 |
| 2003/0015395 | A1 | 1/2003 | Hallowell et al. | 194/206 |
| 2003/0015396 | A1 | 1/2003 | Mennie | 194/206 |
| 2003/0059098 | A1 | 3/2003 | Jones et al. | 382/135 |
| 2003/0062242 | A1 | 4/2003 | Hallowell et al. | 194/302 |

| | | | | |
|---|---|---|---|---|
| 2003/0081824 | A1 | 5/2003 | Mennie et al. | 382/135 |
| 2003/0108233 | A1 | 6/2003 | Raterman et al. | 382/135 |
| 2003/0121752 | A1 | 7/2003 | Stromme et al. | 194/207 |
| 2003/0121753 | A1 | 7/2003 | Stromme et al. | 194/207 |
| 2003/0132281 | A1 | 7/2003 | Jones et al. | 235/379 |
| 2003/0139994 | A1 | 7/2003 | Jones | 705/36 |
| 2003/0168308 | A1 | 9/2003 | Maier et al. | 194/207 |
| 2003/0174874 | A1 | 9/2003 | Raterman et al. | 382/135 |
| 2003/0182217 | A1 | 9/2003 | Chiles | 705/35 |
| 2003/0198373 | A1 | 10/2003 | Raterman et al. | 382/135 |
| 2004/0003980 | A1 | 1/2004 | Hallowell et al. | 194/206 |
| 2004/0016621 | A1 | 1/2004 | Jenrick et al. | 194/206 |
| 2004/0016797 | A1 | 1/2004 | Jones et al. | 235/379 |
| 2004/0028266 | A1 | 2/2004 | Jones et al. | 382/135 |
| 2004/0083149 | A1 | 4/2004 | Jones | 705/35 |
| 2004/0145726 | A1* | 7/2004 | Csulits et al. | 356/71 |
| 2004/0149538 | A1 | 8/2004 | Sakowski | 194/207 |
| 2004/0153408 | A1 | 8/2004 | Jones et al. | 705/43 |
| 2004/0154964 | A1 | 8/2004 | Jones | 209/534 |
| 2004/0173432 | A1 | 9/2004 | Jones | 194/216 |
| 2004/0251110 | A1 | 12/2004 | Jenrick et al. | 194/207 |
| 2005/0029168 | A1 | 2/2005 | Jones et al. | 209/534 |
| 2005/0035034 | A1 | 2/2005 | Long et al. | 209/534 |
| 2005/0040225 | A1 | 2/2005 | Csulits et al. | 235/379 |
| 2005/0047642 | A1 | 3/2005 | Jones et al. | 382/137 |
| 2005/0060055 | A1 | 3/2005 | Hallowell et al. | 700/95 |
| 2005/0060059 | A1 | 3/2005 | Klein et al. | 700/213 |
| 2005/0060061 | A1 | 3/2005 | Jones | 700/226 |
| 2005/0077142 | A1 | 4/2005 | Tam et al. | 194/217 |
| 2005/0086271 | A1 | 4/2005 | Jones et al. | 707/200 |
| 2005/0087422 | A1 | 4/2005 | Maier et al. | 194/207 |
| 2005/0108165 | A1 | 5/2005 | Jones et al. | 705/43 |
| 2005/0117791 | A2 | 6/2005 | Raterman et al. | 382/135 |
| 2005/0117792 | A2 | 6/2005 | Graves et al. | 382/135 |
| 2005/0150738 | A1 | 7/2005 | Hallowell et al. | 194/206 |
| 2005/0163361 | A1 | 7/2005 | Jones et al. | 382/135 |
| 2005/0163362 | A1 | 7/2005 | Jones et al. | 382/137 |
| 2005/0169511 | A1 | 8/2005 | Jones | 382/135 |
| 2005/0173221 | A1 | 8/2005 | Maier et al. | 194/207 |
| 2005/0183928 | A1 | 8/2005 | Jones et al. | 194/207 |
| 2005/0207634 | A1 | 9/2005 | Jones et al. | 382/135 |
| 2005/0213803 | A1 | 9/2005 | Mennie et al. | 382/135 |
| 2005/0241909 | A1 | 11/2005 | Mazur et al. | 194/207 |
| 2005/0249394 | A1 | 11/2005 | Jones et al. | 382/135 |
| 2005/0265591 | A1 | 12/2005 | Jones et al. | 382/135 |
| 2005/0276458 | A1 | 12/2005 | Jones et al. | 382/135 |
| 2005/0278239 | A1 | 12/2005 | Jones et al. | 705/35 |
| 2006/0010071 | A1 | 1/2006 | Jones et al. | 705/42 |
| 2006/0054455 | A1 | 3/2006 | Kuykendall et al. | 194/217 |
| 2006/0078186 | A1 | 4/2006 | Freeman et al. | 382/135 |
| 2006/0182330 | A1 | 8/2006 | Chiles | 382/135 |
| 2006/0195567 | A1 | 8/2006 | Mody et al. | 709/224 |
| 2006/0210137 | A1 | 9/2006 | Raterman et al. | 382/135 |
| 2006/0274929 | A1 | 12/2006 | Jones et al. | 382/135 |
| 2007/0071302 | A1 | 3/2007 | Jones et al. | 382/135 |
| 2007/0076939 | A1 | 4/2007 | Jones et al. | 382/135 |
| 2007/0078560 | A1 | 4/2007 | Jones et al. | 700/224 |
| 2007/0095630 | A1 | 5/2007 | Mennie et al. | 194/206 |
| 2007/0112674 | A1 | 5/2007 | Jones et al. | 705/45 |
| 2007/0122023 | A1 | 5/2007 | Jenrick et al. | 382/135 |
| 2007/0172107 | A1 | 7/2007 | Jones et al. | 382/137 |
| 2007/0209904 | A1 | 9/2007 | Freeman et al. | 194/210 |
| 2007/0221470 | A1 | 9/2007 | Mennie et al. | 194/216 |
| 2007/0237381 | A1 | 10/2007 | Mennie et al. | 382/135 |
| 2007/0258633 | A1 | 11/2007 | Jones et al. | 382/135 |
| 2007/0269097 | A1 | 11/2007 | Chiles et al. | 382/135 |
| 2007/0278064 | A1 | 12/2007 | Hallowell et al. | 194/206 |
| 2008/0006505 | A1 | 1/2008 | Renz et al. | 194/206 |
| 2008/0033829 | A1 | 2/2008 | Mennie et al. | 705/16 |
| 2008/0044077 | A1 | 2/2008 | Mennie et al. | 382/135 |
| 2008/0060906 | A1 | 3/2008 | Fitzgerald et al. | 194/207 |
| 2008/0123932 | A1 | 5/2008 | Jones et al. | 382/135 |
| 2008/0133411 | A1 | 6/2008 | Jones et al. | 705/42 |

FOREIGN PATENT DOCUMENTS

| | | | |
|---|---|---|---|
| GB | 2 093 179 | A | 8/1982 |
| GB | 2 204 166 | A | 11/1988 |
| GB | 2 272 762 | A | 5/1994 |
| GB | 2 355 522 | A | 4/2001 |
| WO | WO 87/06041 | A1 | 10/1987 |
| WO | WO 91/11778 | | 8/1991 |
| WO | WO 92/17394 | | 10/1992 |
| WO | WO 93/23824 | | 11/1993 |
| WO | WO 95/24691 | | 9/1995 |
| WO | WO 96/10800 | | 4/1996 |
| WO | WO 96/36933 | | 11/1996 |
| WO | WO 97/30422 | | 8/1997 |
| WO | WO 97/43734 | | 11/1997 |
| WO | WO 97/45810 | | 12/1997 |
| WO | WO 98/12662 | | 3/1998 |
| WO | WO 98/13785 | | 4/1998 |
| WO | WO 98/24052 | | 6/1998 |
| WO | WO 98/24067 | | 6/1998 |
| WO | WO 98/35323 | | 8/1998 |
| WO | WO 98/40839 | | 9/1998 |
| WO | WO 98/47100 | | 10/1998 |
| WO | WO 98/50892 | | 11/1998 |
| WO | WO 98/59323 | | 12/1998 |
| WO | WO 99/09511 | | 2/1999 |
| WO | WO 99/14668 | | 3/1999 |
| WO | WO 99/23601 | | 5/1999 |
| WO | WO 99/41695 | | 8/1999 |
| WO | WO 99/48040 | | 9/1999 |
| WO | WO 99/48042 | | 9/1999 |
| WO | WO 00/24572 | | 5/2000 |
| WO | WO 01/08108 | | 2/2001 |
| WO | WO 01/59685 | | 8/2001 |
| WO | WO 01/59723 | | 8/2001 |
| WO | WO 02/29735 | | 4/2002 |
| WO | WO 02/054360 | | 7/2002 |
| WO | WO 03/005312 | | 1/2003 |
| WO | WO 03/028361 | | 4/2003 |
| WO | WO 03/029913 | | 4/2003 |
| WO | WO 03/030113 | | 4/2003 |
| WO | WO 03/067532 | | 8/2003 |
| WO | WO 03/107282 | | 12/2003 |
| WO | WO 2004/010367 | | 1/2004 |
| WO | WO 2004/027717 | | 4/2004 |
| WO | WO 2004/036508 | | 4/2004 |
| WO | WO 2004/038631 | | 5/2004 |
| WO | WO 2004/068422 | | 8/2004 |
| WO | WO 2005/013209 | A2 | 2/2005 |
| WO | WO 2005/017842 | A1 | 2/2005 |
| WO | WO 2005/028348 | A2 | 3/2005 |
| WO | WO 2005/029240 | A2 | 3/2005 |
| WO | WO 2005/036445 | A1 | 4/2005 |
| WO | WO 2005/076229 | A1 | 8/2005 |
| WO | WO 2006/039439 | A2 | 4/2006 |
| WO | WO 2006/076289 | A2 | 7/2006 |
| WO | WO 2006/076634 | A2 | 7/2006 |
| WO | WO 2007/044570 | A2 | 4/2007 |
| WO | WO 2007/120825 | A2 | 10/2007 |
| WO | WO 2007/143128 | A2 | 12/2007 |
| WO | WO 2008/030356 | A1 | 3/2008 |

* cited by examiner

CURRENCY BILL SENSOR ARRANGEMENT

CROSS REFERENCE TO RELATED APPLICATIONS

This application claims the benefit of U.S. Provisional Application No. 60/950,263, filed Jul. 17, 2007, which is incorporated herein by reference in its entirety.

FIELD OF THE INVENTION

The present disclosure relates generally to currency processing systems, and more particularly, to currency processing systems including a currency bill sensor arrangement.

BACKGROUND OF THE INVENTION

Currency processing devices typically include an input receptacle, a transport mechanism, a sensor, and an output receptacle. As currency bills are transported along a transport path, the sensor senses at least one characteristic associated with the transported currency bills. The currency processing devices typically compare information associated with the sensed characteristic to master data in order to make a judgment about a currency bill. As the number of different types (e.g., denominations, series, etc.) of currency bills increases, the size of the master data set increases. Thus, producing a device that can efficiently process a high number of mixed denomination and mixed series of currency bills is becoming ever more difficult.

However, today, many banknotes have different color prints on each side of the banknote. For example, most United States currency in circulation has two opposing surfaces or sides. One side is generally printed with green ink (e.g., green side) and the other side is generally printed with black ink (e.g., black side). The difference in color can be sensed from an optical sensor and used to determine the currency's face orientation (e.g., face up or face down). Such a determination can be used to increase the speed and efficiency of processing banknotes by reducing the size of the master data set needed for comparison when, for example, denominating a banknote. Additionally, such a determination can be used to decrease the cost of a currency processing device, as the ability to make such a determination reduces the required processing power.

SUMMARY OF THE INVENTION

According to some embodiments, a currency processing device including a currency bill sensor arrangement is provided. The sensor arrangement utilizes one or more optical wavelengths, scans a banknote, and generates an electrical signal indicative of characteristics of the banknote. The electrical signal is processed and several sub-signals are obtained from the original electrical signal. A first sub-signal is an intensity signal which can be used for banknote processing, such as for denomination and/or authentication of the banknote by matching the obtained signal to a known master template and/or master data. A second sub-signal is an optical intensity difference of two or more wavelengths. Throughout the disclosure, this intensity difference can also be referred to as a difference signal, a reflectance difference, or Δ. The reflectance difference (Δ) can be used also to denominate by matching and/or comparing the reflectance difference (Δ) to a known template and/or master data or otherwise making a judgment using the reflectance difference and/or master data. In addition, Δ can be used to indicate a face orientation of a banknote (e.g., face up or face down), and/or to identify a series of a banknote, among other aspects.

According to some embodiments a currency processing device for receiving a stack of U.S. currency bills and rapidly processing all the bills in the stack, the device comprising: an input receptacle adapted to receive a stack of U.S. currency bills of a plurality of denominations, the currency bills having a wide dimension and a narrow dimension; a transport mechanism positioned to transport the bills, one at a time, in a transport direction from the input receptacle along a transport path at a rate of at least about 1000 bills per minute with the narrow dimension of the bills parallel to the transport direction; a currency bill sensor arrangement positioned along the transport path, the currency bill sensor comprising: i) a multi-wavelength light source configured to emit a first wavelength of light and a second wavelength of light; ii) a cylindrical lens positioned to receive the first and second wavelengths of light from the multi-wavelength light source, the cylindrical lens illuminating an elongated strip of light on a surface of one of the plurality of currency bills, the cylindrical lens being configured to receive light reflected from the surface of the one of the plurality of currency bills; iii) a photodetector positioned to receive the reflected light, the photodetector generating an electrical signal in response to the received reflected light; iv) a processor configured to receive the electrical signal generated by the photodetector; wherein, the processor is configured to determine whether the surface of the one of the plurality of currency bills is a primary surface or a secondary surface based on the electrical signal.

Additional aspects of the invention will be apparent to those of ordinary skill in the art in view of the detailed description of various embodiments, which is made with reference to the drawings, a brief description of which is provided below.

DETAILED DESCRIPTION

Figure 1:
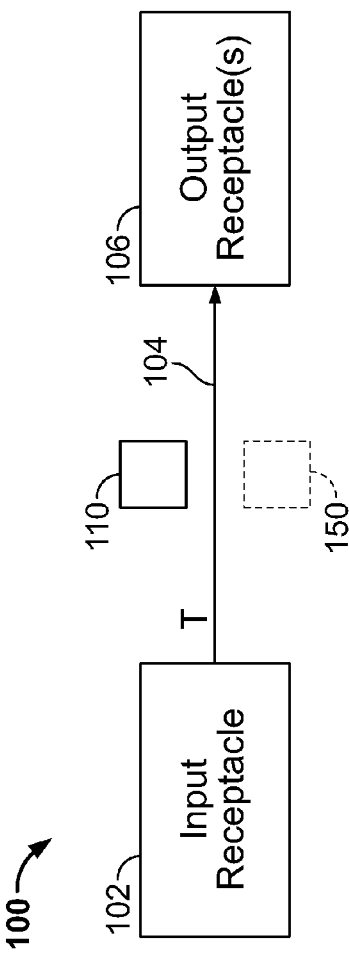
FIG. 1 is a schematic view of a currency processing device according to some embodiments of the present disclosure.

While this invention is susceptible of aspects and embodiments in many different forms, there is shown in the drawings and will herein be described in detail preferred aspects and embodiments of the invention with the understanding that the present disclosure is to be considered as an exemplification of the principles of the invention and is not intended to limit the broad aspect of the invention to the aspects and embodiments illustrated.

Throughout the disclosure, the terms banknote and currency bill and bill are used interchangeably, referring to the same.

Today's banknotes are made from a special banknote paper and one or more colored inks. The paper and the inks can both be analyzed for reflectance and/or transmittance of light to determine a number of different characteristics of the banknote. This analysis is made possible because, for different wavelengths of light, the banknote paper and the ink(s), provide varied reflectances and/or transmittances of light. These varies reflectances and transmittances are analyzed to determine one or more desired characteristics of the banknote. For example, a banknote may be analyzed to determined if the banknote is a counterfeit banknote. Specifically, the reflectance and/or transmittance is analyzed, and if the banknote has different optical reflection and/or transmission characteristics at a particular wavelength than a genuine banknote, then the banknote is a suspect and/or a counterfeit note. Thus, measuring the reflection and transmission of one or more wavelengths of light from a banknote can indicate if the banknote is genuine or suspect (e.g., counterfeit).

A number of security features exist in banknotes today that can be excited with one wavelength of light, and that emit one or more different wavelengths of light. According to some embodiments, a currency bill sensor arrangement takes advantage of these properties to authentic banknotes. For example, a currency bill sensor arrangement includes a light sources that directs a first wavelength of light onto a currency bill. According to embodiments, if a detected reflected wavelength of light is the same as, or substantially the same as, the first wavelength of light, then the currency bill is a suspect and/or counterfeit bill. According to some embodiments, if a detected reflected wavelength of light is different than the first wavelength of light, then the currency bill is authentic.

According to some embodiments, a first wavelength of light can be a wavelength within the ultra violet spectrum (e.g., 254 nm up to 390 nm) and a detected reflected wavelength of light can be in the visible spectrum of light (e.g., 400 nm up to 700 nm). According to some embodiments, a first wavelength of light can be a wavelength within the infrared or near infrared spectrum (e.g., over 700 nm) and a detected reflected wavelength of light can be in the visible spectrum of light (e.g., 400 nm up to 700 nm).

Some banknotes include a security feature that requires two or more different excitation wavelengths simultaneously. To determine authenticity of such a banknote, a similar currency bill sensor arrangement can be used; however, the drive signal is altered such that two or more wavelengths of light are turned on simultaneously. The above described authentication features can be performed by any currency bill sensor arrangement described herein.

According to some embodiments, banknotes are illuminated using a waveguide (e.g., slab waveguide). The waveguide can be used to control light incident upon the banknote. According to some embodiments, the waveguide is a rectangular optically transparent material, such as glass or plastic, which can guide light via a total internal reflection. According to some embodiments, the waveguide can be bent and shaped to combine light from various light sources, and to guide light so that light reaches a currency bill sensor arrangement. According to some embodiments, the waveguide can be used to distribute light from one or more sources of light (e.g. LEDs) to multiple currency bill sensor arrangements. Such embodiments can employ the use of "Y" waveguide couplers or multiple arm waveguide couplers.

According to some embodiments, light can also be distributed using optical fibers, such as multi-mode glass or plastic optical fibers. Using waveguides and/or optical fibers can simplify light distribution in a currency processing system. For example, in a situation where space is limited, the use of waveguides and optical fibers allows for the relocation and rearrangement of necessary components. According to some embodiments, waveguides and/or optical fibers can be used to couple a remotely located light source with a currency bill sensor arrangement. According to some embodiments, when processing bills at high rates of speed (e.g., 1000, 1200, 1500+ bills per minute) a powerful light source is used. Some of these powerful light sources are physically too large to locate near a transport path to illuminate bills being transported. Thus, a waveguide and/or an optical fiber arrangement can be used to direct at least a portion of the light emitted from the remotely located powerful light source onto the bills. According to some embodiments, a powerful light source can generate a large amount of heat. In these embodiments, it may be advantageous to manage the heat provided by the powerful light source by relocating and/or rearranging the light source. Thus, it is advantageous in some embodiments to relocate and/or rearrange the light sources in a particular sensor arrangement. Electrical noise can pose additional problems that can be eliminated or attenuated when using waveguides and/or optical fibers to relocate a photodetector. The above described waveguides and optical fibers can be used with any of the currency bill sensor arrangements described herein.

According to some embodiments, a currency bill sensor arrangement can be used for detecting an edge of a banknote. For example, the currency bill sensor arrangement emits an elongated strip of light. A transport mechanism of a currency processing device transports a banknote along a transport path in a direction perpendicular to the elongated strip of light. For a currency bill sensor arrangement operating in a reflection mode, as the edge of the banknote approaches and intersects the elongated strip of light, a photodetector senses a drastic increase in reflection of light. For a currency bill sensor arrangement operating in a transmission mode, as the edge of the banknote approaches and intersects the elongated strip of light, a photodetector senses a drastic decrease in transmission of light. This drastic change (either increase or decrease depending on the mode) indicates arrival of the edge of the banknote. The currency bill sensor arrangement is similarly able to determine the opposite edge of the banknote as a drastic change also occurs when the banknote is transported such that the elongated strip of light no longer intersects the banknote. According to some embodiments, the currency bill sensor arrangement can also indicate if there is a tear or a hole in the banknote, as the photodetector will similarly detect a drastic change in reflected or transmitted light when incident on a hole or tear. The above described edge detection and hole detection features can be performed by any currency bill sensor arrangement described herein.

According to some embodiments, a currency bill sensor arrangement can determine the width of a banknote being transported along a transport path by a transport mechanism. According to some embodiments, a currency bill sensor arrangement is placed close to an outer edge of a banknote being transported such that an elongated strip of light is incident on a surface of the banknote. According to some embodiments, a pair of currency bill sensor arrangements are placed close to opposite outer edges of a banknote being transported such that two elongated strips of light are incident on a surface of the banknote. According to some embodiments, when the banknote is not shifted (e.g., the banknote is centered in the transport path), a reflected signal is at a maximum because a maximum amount of light is reflected. Similarly, when the banknote is completely shifted such that the banknote does not coincide with the elongated strip of light (e.g., the banknote is substantially shifted laterally in one direction), the reflected signal is at a minimum because a minimum amount of light is reflected from the surface of the banknote. In these width detecting embodiments, the width may be determined using a lookup table because the intensity of the reflected light is directly proportional to the banknote/elongated strip(s) of light overlap region.

According to some embodiments, a plurality of parallel currency bill sensor arrangements are placed such that the plurality form a contiguous elongated strip of light. Each of the currency bill sensor arrangements include a photodetector. A processor can be configured to receive a plurality of signals from the photodetector in each of the plurality of parallel currency bill sensor arrangements. According to some embodiments, the processor is configured to determine the width of the banknote based on the plurality of signals. For example, in a configuration where nine parallel currency bill sensor arrangements are used, sample data can look like: [0%, 70%, 100%, 100%, 100%, 100%, 100%, 50%, 0%], where the percentages are a percentage of reflected light received by the photodetector in each of the nine currency bill sensor arrangements. This data indicates that the banknote width is larger than the length of 5 elongated strips of light, but smaller than the length of 7 elongated strips of light. The percentages 70% and 50% indicate only a partial overlap between the banknote and the elongated strip of light in those two regions. Thus, according to some embodiments, the processor is programmed to access a lookup table to determine the distance of the overlap corresponding to the 70% and 50% reflectance values. Thus, the processor can estimate the overall length of the banknote using the lookup table. The above described width determination features can be performed by any currency bill sensor arrangement described herein.

According to some embodiments, a currency bill sensor arrangement can detect transmitted light for use in determining a thickness or density of a banknote. Such a currency bill sensor arrangement includes two opposing sub-sensor arrangements such as the currency bill sensor arrangements shown in FIGS. 5, 6, 12, and 13. The thicker the banknote paper, the less light the banknote transmits. The light transmission is inversely proportional to paper density. Additionally, different banknotes scatter light differently because of a variation in paper fibers. Therefore, measured intensity of light transmitted through a banknote can be used to indicate a variation of paper thickness or density from an expected intensity for a genuine banknote. Thus, the measured intensity as compared to an expected intensity value can be used to determine an authenticity of the banknote. The above described authentication feature can be performed by any currency bill sensor arrangement containing two opposing sub-sensor arrangements described herein, such as currency bill sensor arrangements as shown in FIGS. 5, 6, 12, and 13.

According to some embodiments, a currency bill sensor arrangement can be used to determine a banknote's fitness. For example, a measured intensity of light transmitted through an old banknote can be compared to an expected intensity of light transmitted through a known fit banknote. Such a comparison can be used to determine if the banknote is worn, old, and/or unfit. The above described fitness feature can be performed by any currency bill sensor arrangement containing two opposing sub-sensor arrangements described herein, such as currency bill sensor arrangements as shown in FIGS. 5, 6, 12, and 13.

According to some embodiments, a currency bill sensor arrangement can determine if more than one banknote is present (e.g., a stacked or double condition). Namely, the sensor can determine if one or more banknotes are stacked on top of each other during processing. According to some embodiments, during the processing of a plurality of banknotes in a currency processing device, one banknote is transported at a time along a transport path. If two or more banknotes are stacked and transported together, inaccurate and/or incorrect denomination and/or authentication may result for the stacked banknotes. Thus, it is advantageous to have a currency bill sensor arrangement that can determine if more than one banknote is presently being sensed. According to some embodiments, a currency bill sensor arrangement can make such a determination by comparing a measured intensity of light transmitted through the stacked banknotes to an expected intensity of light transmitted through a single banknote. If the measured intensity of transmitted light is significantly below the expected intensity of transmitted light, then it is likely that one or more banknotes are stacked. According to some embodiments, in this situation, a processor is configured to indicate a stacking or doubles error. The above described stacked condition determination feature can be performed by any currency bill sensor arrangement containing two opposing sub-sensor arrangements described herein, such as currency bill sensor arrangements as shown in FIGS. 5, 6, 12, and 13.

According to some embodiments, a currency bill sensor arrangement can determine the face-orientation of a United States banknote. For example, a Series 1 US banknote has two opposing surfaces, where one surface is substantially printed with green ink (e.g., green side) and the other surface is substantially printed with black ink (e.g., black side). According to some embodiments, the currency bill sensor arrangement includes a green light source and a red light source. When illuminating the black side of a Series 1 US banknote with red and green light, the red light reflectance and the green light reflectance is nearly equal. However, when illuminating the green side of a Series 1 US banknote with red and green light, the green light reflectance is higher than the red light reflectance. This is because the green ink absorbs the red light thereby reducing the amount of red light reflectance. Thus, measuring the difference between the green light reflectance and the red light reflectance yields a reflectance difference ($\Delta$). Comparing the reflectance difference ($\Delta$) with a predetermined threshold allows for the determination of whether the light was reflected from the green side or the black side of the Series 1 US banknote.

For another example, a Series 3 US banknote has two opposing surfaces, one surface is substantially printed with green ink (e.g., green side) and the other surface is substantially printed with black ink (e.g., black side). However, the series 3 US banknotes also includes additional ink colors. For example, the black side of a series 3 US twenty-dollar bill includes shades of red and blue inks; and the green side includes shades of red ink. According to some embodiments, the currency bill sensor arrangement includes a green light source and a red light source. According to other embodiments, the currency bill sensor arrangement includes a red light source, a green light source, and a blue light source (RGB). In a similar manner as described above for red and green light sensor arrangement, a difference between the green light reflectance, the red light reflectance, and/or the blue light reflectance yields one or more reflectance differences (Δ). A comparison of the reflectance differences (Δ) with predetermined thresholds can allow for a face-orientation determination.

According to some embodiments, a face-orientation determination helps a currency processing device to process a large volume of banknotes faster, more efficiently, and more cost effectively. For example, when processing mixed denominations of US banknotes, the currency processing device typically must sense each banknote for information indicative of one or more characteristics of the banknote. That information is converted into one or more electrical signals for each banknote. Information associated with the electrical signal(s) is then compared with a plurality of master data sets to denominate and/or authenticate the banknote. However, if the currency processing device first determines the face orientation of the banknote as described above, the currency processing device can eliminate roughly half of the master data sets needed to denominate and/or authenticate. This reduction of data sets allows for more efficient processing of the banknotes, as the amount of processing can be significantly reduced. Thus, less expensive processors may be used to achieve similar banknote processing results. The above described face-orientation determination feature can be performed by any currency bill sensor arrangement described herein.

According to some embodiments, a currency processing device, including a controller and/or a processor, analyzes a reflectance difference (Δ) when processing banknotes. For example, a banknote is sensed using two different wavelengths of light. A photodetector generates a signal associated with an intensity of total light reflected from the banknote. A comparison of the reflectance difference (Δ) between the two different wavelengths of light to a known reflectance difference (Δ) can be used to denominate the banknote, to authenticate the banknote, to indicate the series of the banknote (e.g., as each US series has a specific color), and/or to determine the face orientation of the banknote (e.g. face up or face down). It is contemplated that the wavelengths of light may be visible wavelengths, infrared (IR) wavelengths, and/or ultraviolet (UV) wavelengths of the electromagnetic spectrum.

Referring to FIG. 1, a currency processing system 100 is shown according to some embodiments of the present disclosure. The currency processing system 100 includes an input receptacle 102, a transport mechanism 104, one or more output receptacles 106, and a currency bill sensor arrangement 110 (e.g., currency bill sensor arrangements of FIGS. 2-3 and 8-10). According to some embodiments, the currency processing system 100 can optionally include a second currency bill sensor arrangement 150 (e.g., currency bill sensor arrangements of FIGS. 5, 6, 12, and 13). According to some embodiments, an operator of the currency processing system 100 puts a stack of mixed denomination bills, such as a stack of U.S. currency bills having a plurality of U.S. denominations, into the input receptacle 102. The transport mechanism 104 then transports the stack of bills, one at a time, that is in a serial fashion along a transport path (T). As the bills are transported, they all pass by the currency bill sensor arrangement 110 and/or by the second currency bill sensor arrangement 150. As described above, the currency bill sensor arrangements 110, 150 can be configured to determine one or more of the following characteristics of the bills individually and/or in combination: the denominations of the bills, authenticity of the bills, face orientation of the bills, fitness of the bills, edges of the bills, edges of a print of the bills, widths of the bills, thickness and/or density of the bills, a stacked bill condition, a doubles condition, series of the bills, or any combination thereof. Examples of currency processing devices and systems can be found in commonly assigned U.S. Pat. No. 6,311,819, titled, "Method and Apparatus for Document Processing," and U.S. Pat. No. 6,398,000, titled, "Currency Handling System Having Multiple Output Receptacles," which are both hereby incorporated by reference in their entirety.

Figure 2:
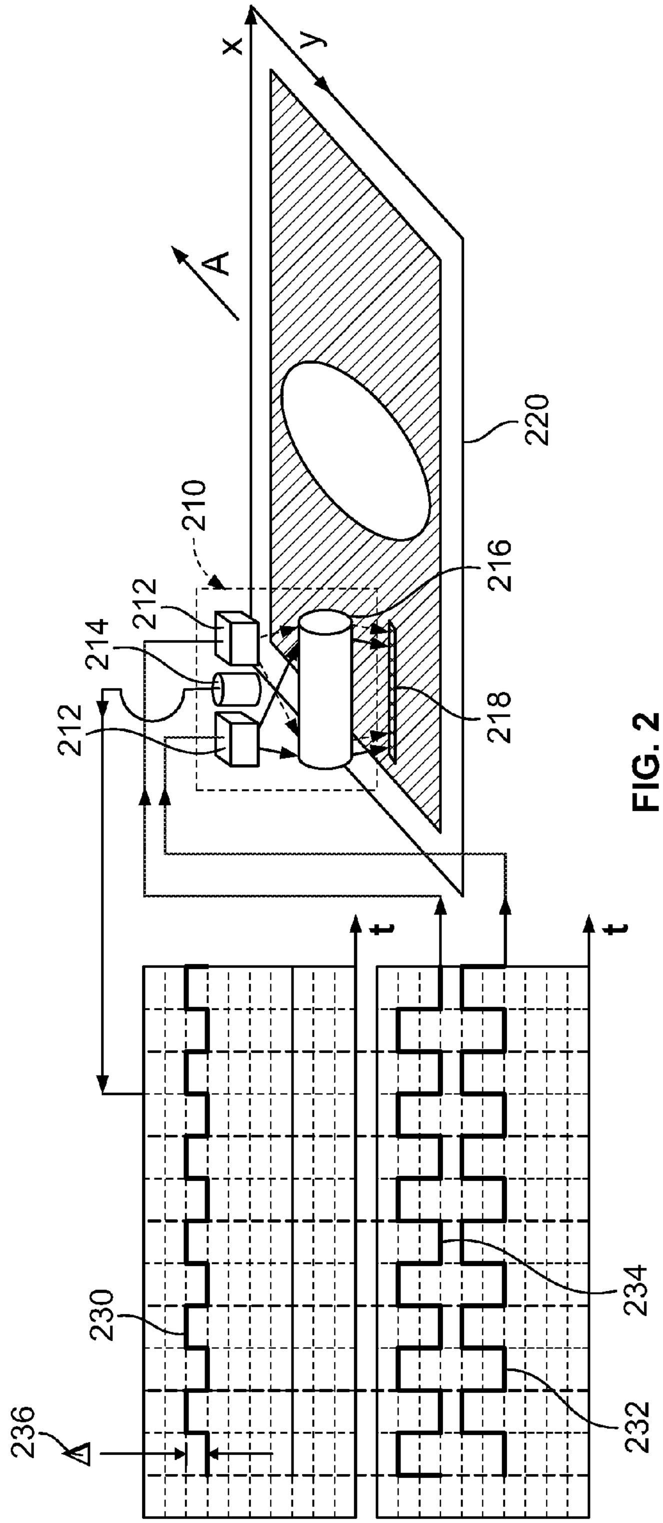
FIG. 2 is a perspective view of a currency bill sensor arrangement having two light sources according to some embodiments.

Referring to FIG. 2, a currency bill sensor arrangement 210 ("sensor arrangement") is shown according to some embodiments. The sensor arrangement 210 includes two light sources 212, a photodetector 214, and a cylindrical lens 216.

According to some embodiments, the light sources 212 can be light emitting diodes (LEDs), lasers, laser diodes (LD), halogen lamps, fluorescent lamps or any combination thereof. For LED light sources, the above and below described emitted wavelengths of light refer to a peak emission of the LEDs. The light sources 212 emit and direct light and a portion of that light is received by the cylindrical lens 216. According to some embodiments, a substantial amount of the emitted light is received by the cylindrical lens 216. According to some embodiments, the two light sources 212 emit two different wavelengths of light. For example, one of the light sources 212 emits a wavelength of about 550 nanometers (green light) and the other light source 212 emits a wavelength of about 635 nanometers (red light). Various other combinations of wavelengths are contemplated.

For example, it is contemplated that one of the light sources emits a wavelength between about 520 nanometers and 580 nanometers, while the other light source emits a wavelength between about 605 nanometers and 665 nanometers. According to some embodiments, one of the light sources 212 emits a wavelength of about 550 nanometers and the other light source 212 emits a wavelength of about 450 nanometers. According to some embodiments, one of the light sources emits a wavelength between about 520 nanometers and 580 nanometers, while the other light source emits a wavelength between about 420 nanometers and 480 nanometers.

According to some embodiments, a sensor arrangement (e.g., sensor arrangement 210) can include three light sources, where each of the three light sources emits a different wavelength or a different range of wavelengths of light. For example, according to some embodiments, one of the light sources emits a first wavelength of about 635 nanometers (red light), another of the light sources emits a second wavelength of about 550 nanometers (green light), and another light source emits a third wavelength of about 450 nanometers (blue light). Yet, according to some embodiments, one of the light sources emits a first wavelength between about 650 nanometers and 665 nanometers, another of the light sources emits a second wavelength between about 520 nanometers and 580 nanometers, and another light source emits a wavelength between about 420 nanometers and 480 nanometers.

While the above light source examples are described in reference to FIG. 2, the same or similar variations of the number of light sources and the ranges of emitted wavelengths of light are applicable to any currency bill sensor arrangement described herein.

A cylindrical lens can also be referred to as a rod lens. According to some embodiments, the cylindrical lens 216 has a circular cross-section. According to other embodiments, a cylindrical lens (e.g., cylindrical lens 216, 316, 516, 556, 616, 656, 816, 916, 1016, 1216, 1256, 1316, 1356), such as cylindrical lens 216, can have an oval, a half cylinder, or a half-moon shaped cross-section. Yet according to other embodiments, the cylindrical lens 216 has an aspheric shaped cross-section. A defining characteristic of the cylindrical lens 216 is that the cylindrical lens 216 has light focusing characteristics in one dimension but not in a second dimension. For example, as shown in FIG. 2, the cylindrical lens 216 focuses light in a Y dimension but not in an X dimension. According to some embodiments, the cylindrical lens illuminates or focuses light on a top surface of a currency bill 220. The incident light forms an elongated strip of light 218. The cylindrical lens 216 serves to narrow the elongated strip of light 218 in the Y dimension, while distributing and/or expanding the light along the X dimension.

The size of the elongated strip of light 218 is directly correlated with the size and position of the cylindrical lens 216. For example, a cylindrical lens with a larger diameter and a larger length will produce a larger elongated strip of light 218. Similarly, the relative distances between the light sources 212, the cylindrical lens 216, and the bill 220 directly effect the size of the elongated strip of light 218. Such dimensions can influence the design of a sensor arrangement such as the sensor arrangement 210.

For example, it might be desirable to position the light sources 212 at some distance from a transport mechanism (e.g., transport mechanism 104) that transports the bills along a transport path for mechanical reasons. Additionally, some light sources can generate significant amounts of heat that can disrupt and/or complicate the processing of bills or otherwise pose problems. As the light sources are positioned further from the cylindrical lens, a cylindrical lens having a larger diameter may be required.

According to some embodiments, a light source is positioned about 24 millimeters (about 1 inch) from a transport path. In these embodiments, a cylindrical lens having a diameter of about 5 millimeters (about ¼ inch) is used to create an elongated strip of light having a sufficient size to accurately process the bills (e.g., authenticate, denominate, face-orientation determination, series determination, etc.). According to other embodiments a light source is positioned about 13 millimeters (about ½ inch) from a transport path. In these embodiments, a cylindrical lens having a diameter of about 3.8 millimeters (about ⅛ inch) is used to create an elongated strip of light having a sufficient size to accurately process the bills.

According to some embodiments, the cylindrical lens 216 and the light sources 212 are positioned such that the elongated strip of light 218 is about 12.7 millimeters or about 13 millimeters (about ½ inch) in length along the X dimension and between about 0.25 millimeters and 0.35 millimeters (between about 0.01 inches and 0.015 inches) along the Y dimension. Such a configuration is suitable for accurately being able to determine a face orientation of a bill being processed. According to some embodiments, the cylindrical lens 216 and the light sources 212 are positioned such that the elongated strip of light 218 is about 12.7 millimeters or about 13 millimeters (about ½ inch) along the X dimension and about 1 millimeter (about 0.04 inch) along the Y dimension. Such a configuration is suitable for accurately being able to denominate a bill.

The elongated strip of light 218 can be characterized by its resolution. Specifically, the elongated strip of light 218 can have a high resolution in the Y dimension (e.g., 0.3 millimeters) and a low resolution in the X dimension (e.g., 13 millimeters). Such a configuration allows for a bill to shift along the X dimension during processing without significantly affecting, for example, a denomination result and/or a face orientation result.

According to some embodiments, as described above, the light sources 212 emit two different wavelengths of light. The cylindrical lens 216 receives at least a portion of that emitted light and illuminates an elongated strip of light 218 on the top or one surface of bill 220. While, the sensor arrangement 210 is shown in a position over the top of the left half of the bill 220, it is contemplated that according to some embodiments, the sensor arrangement 210 can be located at any position along the X dimension. According to some embodiments, the sensor arrangement 210 is located over the center region or center portion of the bill 220 such that the elongated strip of light 218 is incident upon the center of each bill (e.g., bill 220) being processed and transported along the transport path in the direction of arrow "A."

Once the elongated strip of light 218 is incident on the top or one surface of the bill 220, a portion of that light is reflected and/or scattered from the top or one surface of the bill 220. The cylindrical lens 216 is positioned to receive and/or collect a portion of the reflected light and direct and/or focus the reflected light onto the photodetector 214. According to some embodiments, the cylindrical lens 216 collects a substantial portion of the reflected light. According to some embodiments, the photodetector 214 is positioned over the center of the long dimension of the cylindrical lens 214 to receive the reflected light from the cylindrical lens 216. According to other embodiments, the photodetector is positioned anywhere along the X dimension such that the photodetector 214 can receive the reflected light from the cylindrical lens 216.

According to some embodiments, the light sources 212 are modulated with a periodic wave. According to some embodiments, a controller and/or a processor (not shown) drives the light sources 212 with a modulation signal, also referred to as a periodic wave. As shown in FIG. 2, one of the light sources 212 is driven with a modulation signal 232 and the other light source 212 is driven with a modulation signal 234. According to some embodiments, the modulation signal 232 and the modulation signal 234 are out-of-phase. The two modulation signals 232, 234 are 180 degree phase shifted, namely one is the inverse of the other. Thus, the modulation of the light sources 212 with modulation signals 232, 234 results in one light source being on while the other light source is off.

According to some embodiments, as the bill 220 is transported in the direction of arrow "A," the sensor arrangement 210 illuminates a modulated elongated strip of light 218 on the top surface of the bill 220. According to some embodiments, the modulated elongated strip of light 218 rapidly switches between two different wavelengths of light. According to some embodiments, the two wavelengths are a red color wavelength and a green color wavelength. According to some embodiments, the two wavelengths are modulated between about 5 and 100 kHz. According to some embodiments, the two wavelengths are modulated between about 5 and 10 kHz.

According to some embodiments, the photodetector 214 receives modulated light from the cylindrical lens 216. The photodetector is configured to generate or produce an electrical signal 230 in response to the received modulated light. The electrical signal 230 is proportional to the light intensity incident on the photodetector 214. When there is a difference in reflectance from the bill 220 between the two modulated wavelengths of light, the electrical signal 230 is also modulated. An example of a modulated electrical signal is exemplified in FIG. 2, where the electrical signal 230 is modulated. A reflectance difference (Δ) 236 of the electrical signal 230 corresponds to a difference in reflectance between the two wavelengths of light. The reflectance difference (Δ) 236 can be used in banknote processing, such as to determine one or more of the following characteristics of the bill 220: a denomination of the bill, an authenticity of the bill, a face orientation of the bill, a fitness of the bill, an edge of the bill, an edge of a print of the bill, a width of the bill, a series of the bill, or any combination thereof.

Figure 3:
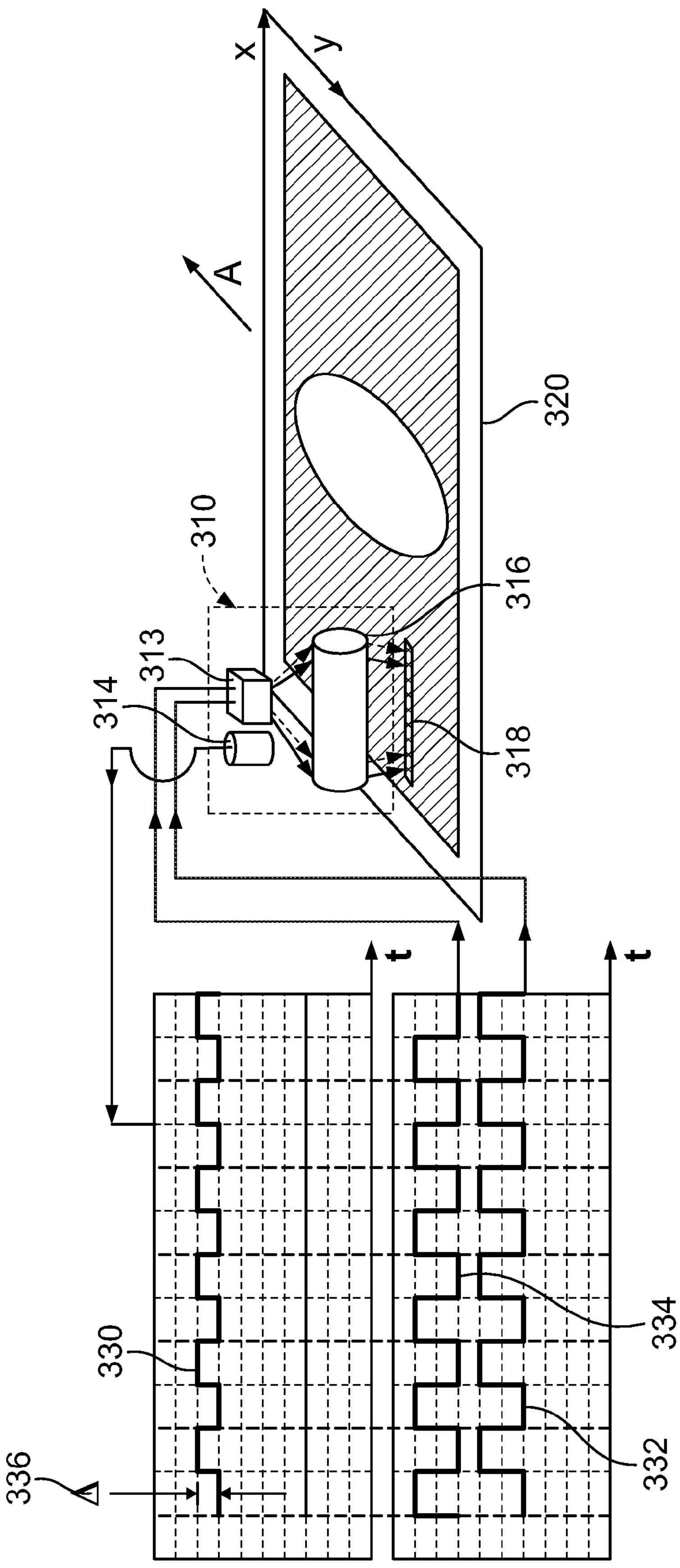
FIG. 3 is a perspective view of a currency bill sensor arrangement having a multi-wavelength light source according to some embodiments.

Referring to FIG. 3, a currency bill sensor arrangement 310 ("sensor arrangement") is shown according to some embodiments. The sensor arrangement 310 includes a multi-wavelength light source 313, a photodetector 314, and a cylindrical lens 316. The sensor arrangement 310 is similar to the sensor arrangement 210; however, instead of including two light sources, the sensor arrangement 310 includes one light source 313 that is capable of emitting two or more wavelengths of light.

According to some embodiments, the multi-wavelength light source 313 emits two different wavelengths of light. According to some embodiments, the two different wavelengths are at about 550 nanometers (green light) and at about 635 nanometers (red light). According to other embodiments, the multi-wavelength light source 313 emits three different wavelengths of light. For example, according to some embodiments, the multi-wavelength light source 313 emits a red color wavelength, a green color wavelength, and a blue color wavelength. According to some embodiments, these three different wavelengths of light can be used in denominating bill 320, authenticating bill 320, determining a face orientation of bill 320, determining a series of bill 320, determining an edge of bill 320, or any combination thereof. According to some embodiments, a multi-wavelength light source, similar to or the same as multi-wavelength light source 313, can be used instead of two light sources in any currency bill sensor arrangement described herein.

The multi-wavelength light source 313 outputs modulated light in the same or similar fashion as light source 212 described above in relation to FIG. 2. According to some embodiments, a controller and/or a processor drives the multi-wavelength light source 313 with a first modulated signal 332 and a second modulated signal 334 in a similar fashion as described above in relation to FIG. 2. Namely, one of the modulation signals 332 controls one of the wavelength light outputs, and the other modulation signal 334 controls the other wavelength light output. The modulated light is focused or directed onto one surface, such as a top surface, of bill 320. The light illuminates an elongated strip of light 318 onto the bill 320 via the cylindrical lens 316. The light is scattered and/or reflected from the top surface of the bill 320. The scattered and/or reflected light is collected and/or received by the cylindrical lens 316, and directed or focused onto the photodetector 314. The photodetector 314 generates or produces an electrical signal 320 that is proportional to the light intensity incident on the photodetector 314.

The two modulated signals 332, 334 are 180 degree phase shifted, namely one is the inverse of the other. Thus, the modulation forces the multi-wavelength light source 313 to switch or alternate between two different wavelengths (e.g., colors) periodically. As described in relation to FIG. 2, a reflectance difference (Δ) 336 of the electrical signal 330 corresponds to a difference in reflectance between the two wavelengths of light. The reflectance difference (Δ) 336 can be used in banknote processing, such as to determine one or more of the following characteristics of the bill 320: a denomination of the bill, an authenticity of the bill, a face orientation of the bill, a fitness of the bill, an edge of the bill, an edge of a print of the bill, a width of the bill, a series of the bill, or any combination thereof.

Figure 4:
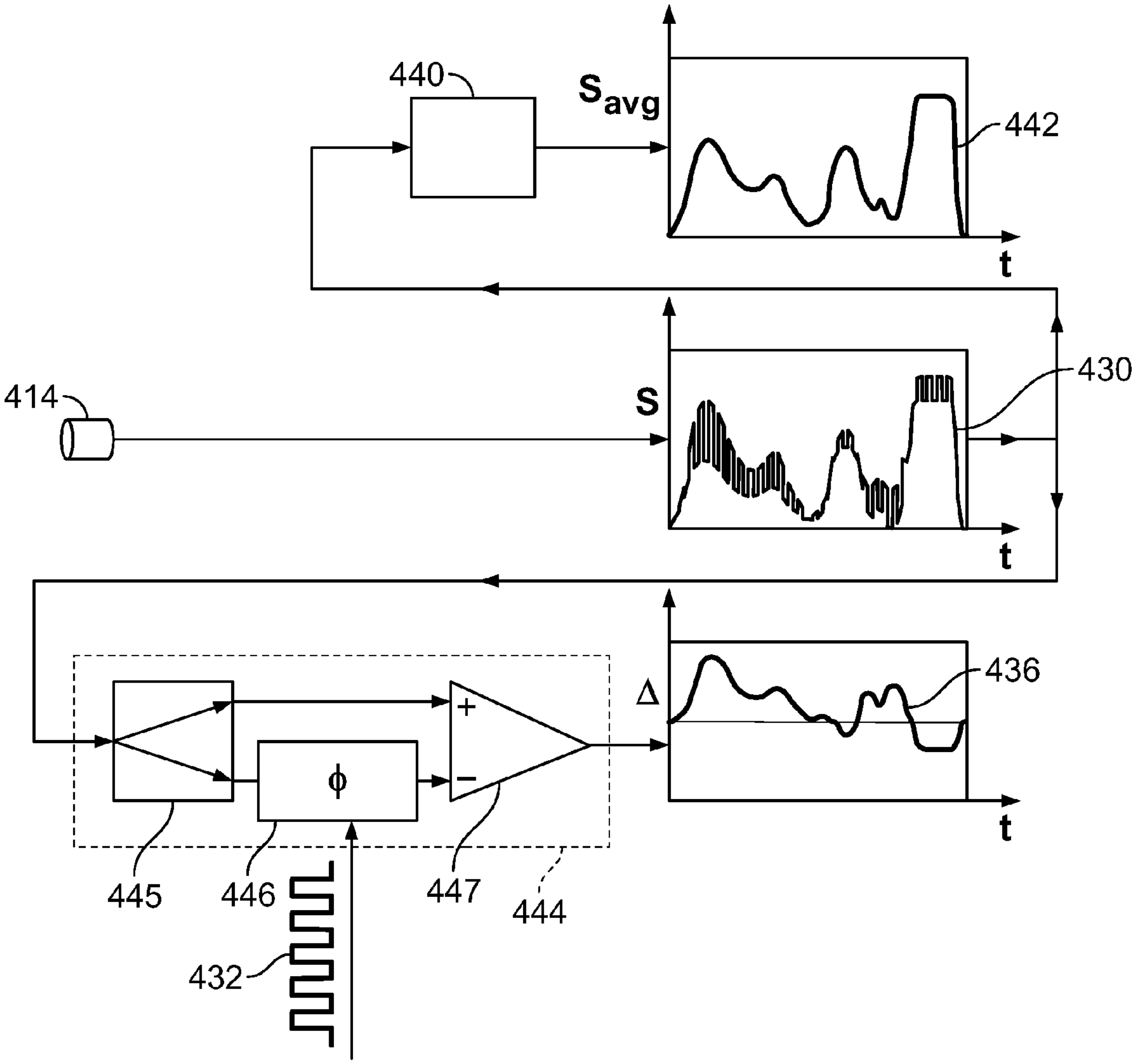
FIG. 4 is a flow diagram demonstrating two methods of processing an electrical signal from a photodetector according to some embodiments.

Referring to FIG. 4, a flow diagram illustrating two methods for processing an electrical signal from a photodetector to obtain reflectance information is shown according to some embodiments. Specifically, a photodetector 414 generates or produces an electrical signal 430, which is plotted in FIG. 4 for illustrative purposes. The electrical signal is similar to electrical signals 230, 330 of FIGS. 2 and 3. The electrical signal 430 shown illustrates a modulated reflectance signal over time. The photodetector 414 can be the same as or similar to photodetectors 214, 314. Two methods of signal processing are shown. Both methods can be used to obtain information associated with the reflectance of light from a surface of a bill. The information can then be used in determining one or more characteristics (e.g., denomination, authenticity, face-orientation, etc.) of a bill being processed (e.g., bill 220, 320).

The first method passes the electrical signal 430 through an averaging filter 440, also referred to as a low-pass filter, that only passes frequencies lower than the modulation frequency (e.g., 5-10 kHz). The averaging filter 440 yields a signal that is the average reflectance ($S_{avg}$) 442 of two different wavelengths reflected from a top surface of a bill (e.g., bill 220, 320). According to some embodiments, the average reflectance 442 can be used in banknote processing, such as to determine one or more of the following characteristics of the bill: a denomination of the bill, an authenticity of the bill, a face orientation of the bill, a fitness of the bill, an edge of the bill, an edge of a print of the bill, a width of the bill, a series of the bill, or any combination thereof.

The second method passes the electrical signal 430 through a wavelength separation circuit 444. The wavelength separation circuit includes a signal splitter 445, a phase shifter 446, and a difference amplifier 447. The electrical signal 430 is split in two via the signal splitter 445. One part of the split electrical signal is phase shifted 180 degrees (e.g., a half cycle), which is clocked with a modulation signal 432, the same as or similar to modulation signals 232, 332. The phase shifted signal is subtracted from the non-phase shifted signal by the difference amplifier 447. The resulting signal is a reflectance difference signal (Δ), which is associated with a difference of reflectance intensity between the two different wavelengths reflected from the top surface of the bill (e.g., bill 220, 320). As described above in relation to FIGS. 2 and 3, the reflectance difference can be used in banknote processing, such as to determine one or more of the following characteristics of the bill (e.g., bill 220, 320): a denomination of the bill, an authenticity of the bill, a face orientation of the bill, a fitness of the bill, an edge of the bill, an edge of a print of the bill, a width of the bill, a series of the bill, or any combination thereof.

Figure 5:
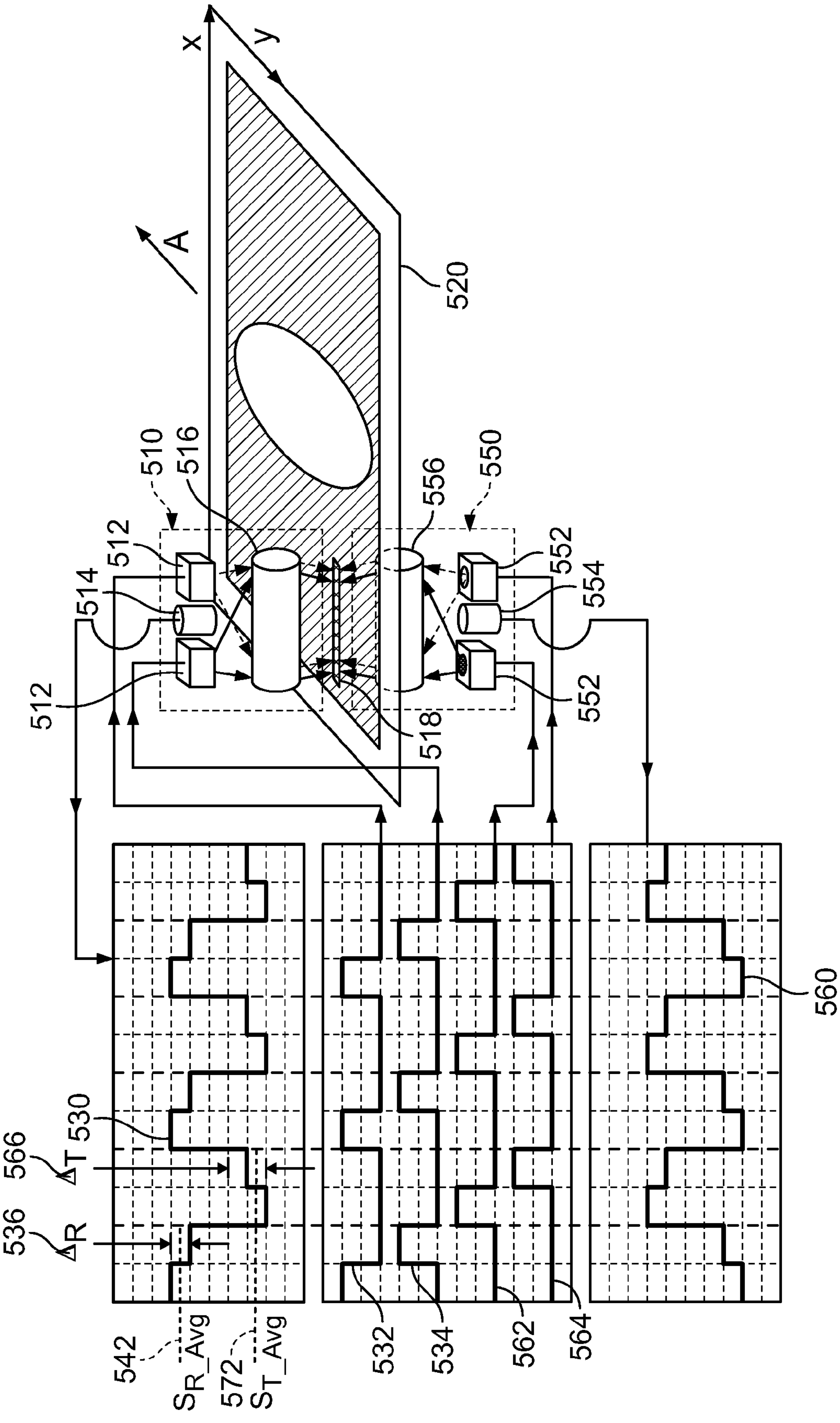
FIG. 5 is a perspective view of two currency bill sensor arrangements on opposite sides of a transport path for allowing detection of reflected and transmitted light according to some embodiments.

Referring to FIG. 5, a pair of currency bill sensor arrangements 510, 550 ("sensor arrangement") is shown according to some embodiments. The sensor arrangement 510 includes two light sources 512, a photodetector 514, and a cylindrical lens 516. The sensor arrangement 510 is similar to, or the same as, the sensor arrangement 210 shown in FIG. 2. The sensor arrangement 550 includes two light sources 552, a photodetector 554, and a cylindrical lens 556; however, the sensor arrangement 550 is located on an opposite side of a transport path that a currency bill 520 is being moved along in the direction of arrow A. The sensor arrangement 550 is similar to, or the same as, the sensor arrangement 210 shown in FIG. 2, except that the sensor arrangement 550 is positioned adjacent to an opposing surface of the bill 520 relative to the sensor arrangement 510.

According to some embodiments, the pair sensor arrangements 510, 550 simultaneously measures reflection and transmission of light from bill 520. Specifically, according to some embodiments, the sensor arrangement 510 is configured to measure light reflected from a top surface of the bill 520 and light transmitted from the cylindrical lens 556 through the bill 520. Similarly, according to some embodiments, the sensor arrangement 550 is configured to measure light reflected from a bottom surface of the bill 520 and light transmitted from the cylindrical lens 516 through the bill 520.

As described above in relation to the sensor arrangement 210, the two light sources 512 emit light and the cylindrical lens 516 receives and focuses a portion of that emitted light in an elongated strip of light 518 on the top surface of the bill 520. Similarly, according to some embodiments, the two light sources 552 emit light and the cylindrical lens 556 receives and focuses a portion of that emitted light in an elongated strip of light 518 on the bottom surface of the bill 520. Yet according to other embodiments, only the sensor arrangement 510 emits light and the sensor arrangement 550 is configured to only receive transmitted light but not emit light. In these embodiments, the sensor arrangement 550 does not need to include the light sources 552.

Referring back to the embodiments illustrated in FIG. 5, a portion of the light from the elongated strip of light 518 scatters and/or reflects from the top surface of the bill 520. A portion of the scattered and/or reflected light is received and/or collected by the cylindrical lens 516, and directed or focused onto the photodetector 514. Simultaneously and/or intermittently, a portion of the light emitted from light sources 552 is transmitted through the bill 520 and received and/or collected by the cylindrical lens 516. This transmitted light is also directed and/or focused onto the photodetector 514. According to some embodiments, the photodetector 514 produces or generates an electrical signal 530 that is proportional to the light intensity incident on the photodetector 514.

In a similar fashion as described above in relation to sensor arrangement 210, each of the light sources 512, 552 are driven with a modulation signal. Specifically, modulation signal 532 drives one of the light sources of the sensor arrangement 510 and modulation signal 534 drives the other light source of sensor arrangement 510. Similarly, modulation signal 562 drives one of the light sources of the sensor arrangement 550 and modulation signal 564 drives the other light source of sensor arrangement 550.

According to some embodiments, a controller and/or a processor (not shown) drives the light sources 512, 552 such that each one of the four light sources is either on or off. Specifically, the modulation signals 532, 534, 562, 564 are phase shifted by 90 degrees such that each light source operates for a ¼ cycle. Namely the modulation signals 532, 534, 562, 564 are arranged such that the light sources 512 are turned on and off on the top side of the bill 520, in a sequential manner, and then the light sources 552 are turned on and off on the bottom side of the bill 520, also in a sequential manner.

According to some embodiments, the photodetectors 514, 554 are both configured to receive or detect both reflection and transmission of light from the elongated strip of light 518 through the cylindrical lenses 516, 556, respectively. The electrical signal 530 produced or generated by the photodetector 514 is indicative of information associated with the reflected light and the transmitted light received by the photodetector 514. According to some embodiments, an analysis of the electrical signal 530 yields information about an average reflection $S_{R\_avg}$ 542, an average transmission $S_{T\_avg}$ 572, a reflection difference ($\Delta_R$) 536, and a transmission difference ($\Delta_T$) 566.

According to some embodiments, the average reflection $S_{R\_avg}$ 542 and the reflection difference ($\Delta_R$) 536 can be used in banknote processing, such as to determine one or more of the following characteristics of the bill 520: a denomination of the bill, an authenticity of the bill, a face orientation of the bill, a fitness of the bill, an edge of the bill, an edge of a print of the bill, a width of the bill, a series of the bill, or any combination thereof. According to some embodiments, the average transmission $S_{T\_avg}$ 572 and the transmission difference ($\Delta_T$) 566 can be used in banknote processing, such as to determine one or more of the preceding characteristics of the bill 520 and in addition to determine one or more of a thickness and/or density of the bill and a stacked bill condition.

According to some embodiments, the photodetector 554 can also produce an electrical signal 560, which is similar to electrical signal 530. The electrical signal 560 can be used in the same or similar fashion the electrical signal 530 is used as described above. According to some embodiments, the electrical signal 560 can be used to confirm or verify one or more determinations based on the electrical signal 530. For example, a currency processing device (e.g., currency processing device 100) makes a first denomination determination of a bill's denomination to be, for example, a U.S. 5 dollar bill based on a first surface of the bill. However, because a confidence level associated with that first surface determination is, for example, below a predetermined threshold, a second surface determination is performed. Specifically, the currency processing device can be configured to analyze a second electrical signal (e.g., electrical signal 560) of a photodetector (e.g., photodetector 554) located on an opposite side of the bill being denominated. The currency processing device can then compare the first surface denomination determination with the second surface denomination determination in order to more conclusively indicate either a correct denomination (e.g., a determination having a confidence level above the predetermined threshold), or an error. The above described confidence checking feature can be performed by any currency bill sensor arrangement described herein having two opposing sub-sensor arrangements as shown in FIGS. 5, 6, 12, and 13.

Figure 6:
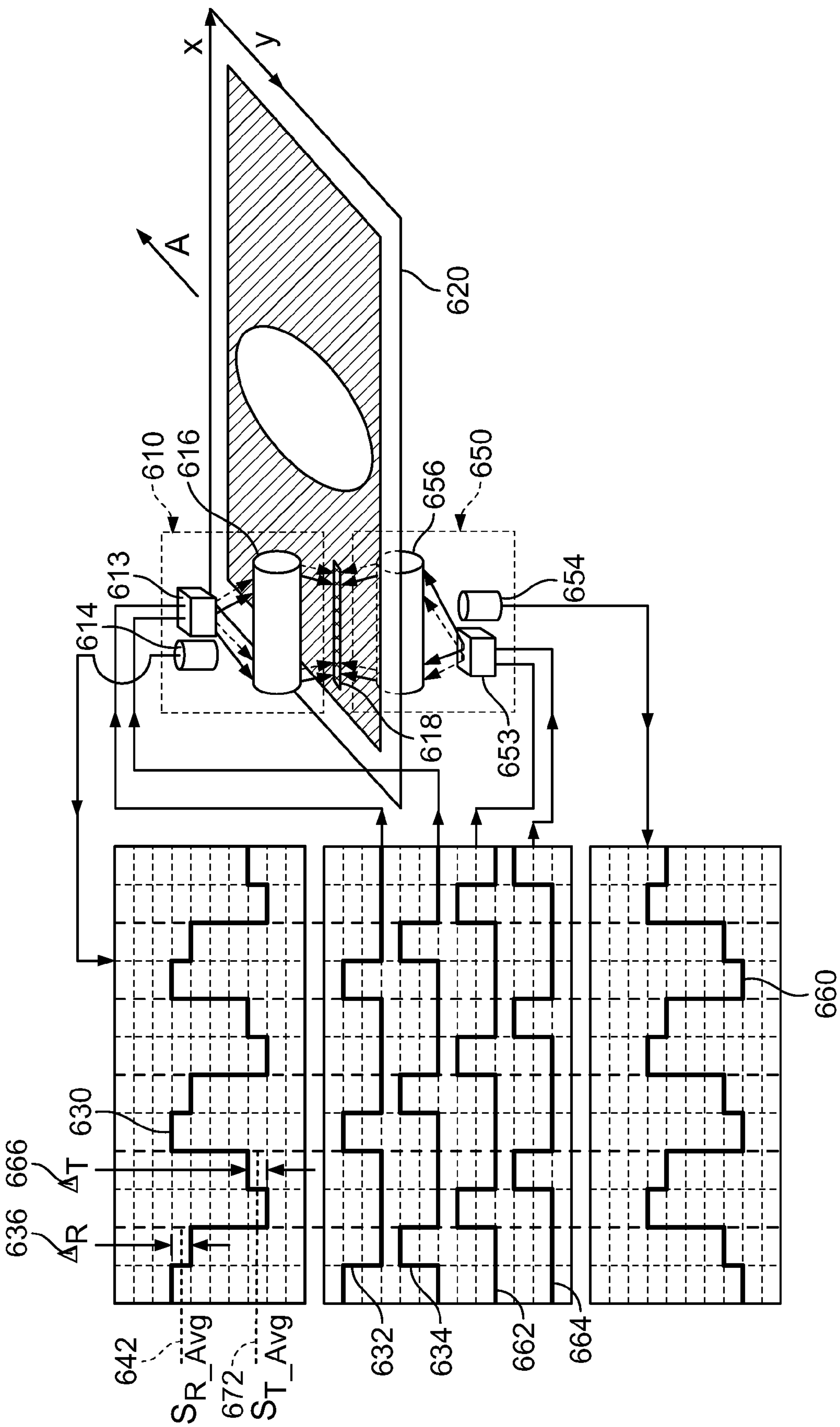
FIG. 6 is a perspective view of two currency bill sensor arrangements on opposite sides of a transport path for allowing detection of reflected and transmitted light according to some embodiments.

Referring to FIG. 6, a pair of currency bill sensor arrangements 610, 650 ("sensor arrangement") is shown according to some embodiments. The sensor arrangement 610 includes a multi-wavelength light source 613, a photodetector 614, and a cylindrical lens 616. The sensor arrangement 610 is similar to or the same as the sensor arrangement 310 shown in FIG. 3. The sensor arrangement 650 includes a multi-wavelength light source 653, a photodetector 654, and a cylindrical lens 656; however, the sensor arrangement 650 is located on an opposite side of a transport path that a currency bill 620 is being moved along in the direction of arrow A. This dual or two sub-sensor arrangement is similar to the two sub-sensor arrangement discussed above and shown in FIG. 5.

The multi-wavelength light sources 613, 653 output modulated light in the same or similar fashion as the multi-wavelength light source 313 described above in relation to FIG. 3. According to some embodiments, a controller and/or a processor (not shown) drives the multi-wavelength light source 613 with a first modulated signal 632 and a second modulated signal 634 in a similar fashion as described above in relation to FIG. 3. Similarly, the controller and/or the processor (not shown) drives the multi-wavelength light source 653 with a third modulated signal 662 and a fourth modulated signal 664.

According to some embodiments, the modulated light from the multi-wavelength light source 613 is focused or directed onto a top surface of the bill 620 and the modulated light from the multi-wavelength light source 653 is focused or directed onto a bottom surface of the bill 620 in the same or similar manner as described above in relation to FIG. 5. An elongated strip of light 618 is incident upon the bill 620 via the cylindrical lenses 616, 656. A portion of the incident light is scattered and/or reflected from the top surface of the bill 620. The scattered or reflected light is collected and/or received by the cylindrical lens 616, and directed or focused onto the photodetector 614. Additionally, a portion of the light from the multi-wavelength light source 653 is transmitted through the bill 620 and a portion of the transmitted light is collected and/or received by the cylindrical lens 616, and directed or focused onto the photodetector 614. The photodetector 614 generates or produces an electrical signal 630 that is proportional to the light intensity incident on the photodetector 614.

According to some embodiments, a portion of the light from the multi-wavelength light source 653 is scattered and/or reflected from the bottom surface of the bill 620. The scattered and/or reflected light is collected and/or received by the cylindrical lens 656, and directed or focused onto the photodetector 654. Additionally, a portion of the light from the multi-wavelength light source 613 is transmitted through the bill 620 and a portion of the transmitted light is collected or received by the cylindrical lens 656, and directed or focused onto the photodetector 654. The photodetector 654 generates or produces an electrical signal 660 that is proportional to the light intensity incident on the photodetector 654.

The four modulated signals 632, 634, 662, 664 are 90 degree phase shifted in the same manner as the modulated signals 532, 534, 562, and 564 described above. According to some embodiments, an analysis of the electrical signal 630 yields information about an average reflection $S_{R\_avg}$ 642, an average transmission $S_{T\_avg}$ 672, a reflection difference ($\Delta_R$) 636, and a transmission difference ($\Delta_T$) 666.

According to some embodiments, the average reflection $S_{R\_avg}$ 642 and the reflection difference ($\Delta_R$) 636 can be used in banknote processing, such as to determine one or more of the following characteristics of the bill 620: a denomination of the bill, an authenticity of the bill, a face orientation of the bill, a fitness of the bill, an edge of the bill, an edge of a print of the bill, a width of the bill, a series of the bill, or any combination thereof. According to some embodiments, the average transmission $S_{T\_avg}$ 672 and the transmission difference ($\Delta_T$) 666 can be used in banknote processing, such as to determine one or more of the preceding characteristics of the bill 620 and in addition to determine one or more of a thickness and/or density of the bill and a stacked bill condition.

According to some embodiments, the photodetector 654 can also produce an electrical signal 660, which is similar to electrical signal 560. The electrical signal 660 produced or generated by the photodetector 654 can be used in the same or similar fashion the electrical signal 630 is used as described above. According to some embodiments, the electrical signal 660 can be used to confirm or verify one or more determinations based on the electrical signal 630, in the same or similar fashion (e.g., confidence checking feature) as described above in relation to FIG. 5.

Figure 7:
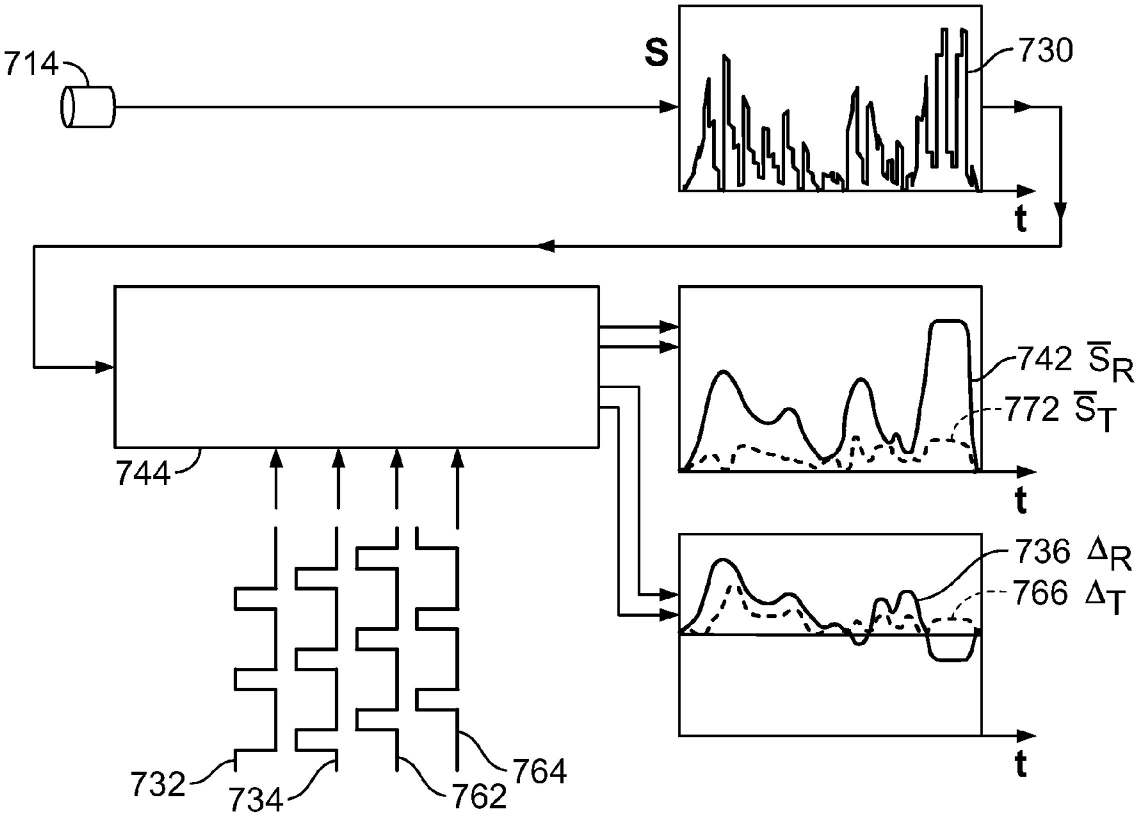
FIG. 7 is a flow diagram demonstrating a method of digitally processing an electrical signal from a photodetector according to some embodiments.

Referring to FIG. 7, a flow diagram illustrating a method of digitally processing an electrical signal from a photodetector to obtain reflectance and transmittance information is shown according to some embodiments. Specifically, a photodetector 714 generates or produces an electrical signal 730, which is plotted in FIG. 7 for illustrative purposes. The electrical signal 730 is similar to electrical signals 530, 560, 630, 660 of FIGS. 5 and 6. The electrical signal 730 shown illustrates a modulated reflectance and transmittance signal over time. The photodetector 714 can be the same as or similar to photodetectors 214, 314, 514, 554, 614, 654. A method of digitally processing an electrical signal is shown. The method can be used to obtain information associated with the reflectance of light from a surface of a bill and/or the transmittance of light from a bill. The information can be used in determining one or more characteristics (e.g., denomination, authenticity, face-orientation, etc.) of a bill being processed.

The electrical signal 730 is modulated by the flashing of four wavelength light sources (e.g., light sources 512 and 552 or multi-wavelength light sources 613 and 653). Two of the four wavelength light sources are located on opposite sides of a bill being processed as shown in FIGS. 5 and 6. The four wavelength light sources are driven by the modulation signals 732, 734, 762, and 764, also known as clock cycles or clock signals. Specifically, modulation signal 732 drives one of the wavelength light sources on a first side and modulation signal 734 drives the other wavelength light source on the first side. Similarly, modulation signal 762 drives one of the wavelength light sources on a second side and modulation signal 764 drives the other wavelength light source on the second side, as depicted in FIGS. 5 and 6.

According to some embodiments, the electrical signal 730 is passed through a digital processing unit 744 to obtain an average reflected signal 742, an average transmitted signal 772, a reflected difference $\Delta_R$ 736, and a transmitted difference $\Delta_T$ 766. The digital processing unit 744 samples the electrical signal 730 at various clock cycles 732, 734, 762, 764. According to some embodiments, the digital processing unit 744 outputs the average reflected signal 742 by sampling the electrical signal 730 at the clock cycle 732 or 734, or by taking the average of the two reflectance signals at clock cycles 732 or 734. According to some embodiments, the digital processing unit 744 outputs the average transmitted signal 772 by sampling the electrical signal 730 at clock cycle 762 or 764, or by taking the average of the two transmittance signals at clock cycles 762 or 764.

According to some embodiments, the digital processing unit 744 outputs the difference of the two reflectance signals $\Delta_R$ 736 by sampling the signal 730 at clock cycles 732 and 734, and then taking the difference of the two intermediate resulting reflectance signals. According to some embodiments, the digital processing unit 744 outputs the difference of the two transmittance signals $\Delta_T$ 766 by sampling the electrical signal 730 at clock cycles 762 and 764, and then taking the difference of the two intermediate resulting transmittance signals.

According to some embodiments, the resulting average reflected signal 742 and the average transmittance signal 772 can be used in banknote processing to denominate bills. According to some embodiments, the reflectance difference and/or the transmittance difference can be used in banknote processing, such as to determine one or more of the following characteristics of the bill (e.g., bill 220, 320): a denomination of the bill, an authenticity of the bill, a face orientation of the bill, a fitness of the bill, an edge of the bill, an edge of a print of the bill, a width of the bill, a thickness and/or density of the bill, a stacked bill condition, a series of the bill, or any combination thereof.

The above described signal difference detection and average signal detection features can be performed by any currency bill sensor arrangements described herein. For currency bill sensor arrangements only having a sensor arrangement on one side of a transport path (e.g., sensor arrangements shown in FIGS. 2-3 and 8-10, instead of four modulated signals being used, only two modulated signals will be used.

Figure 8:
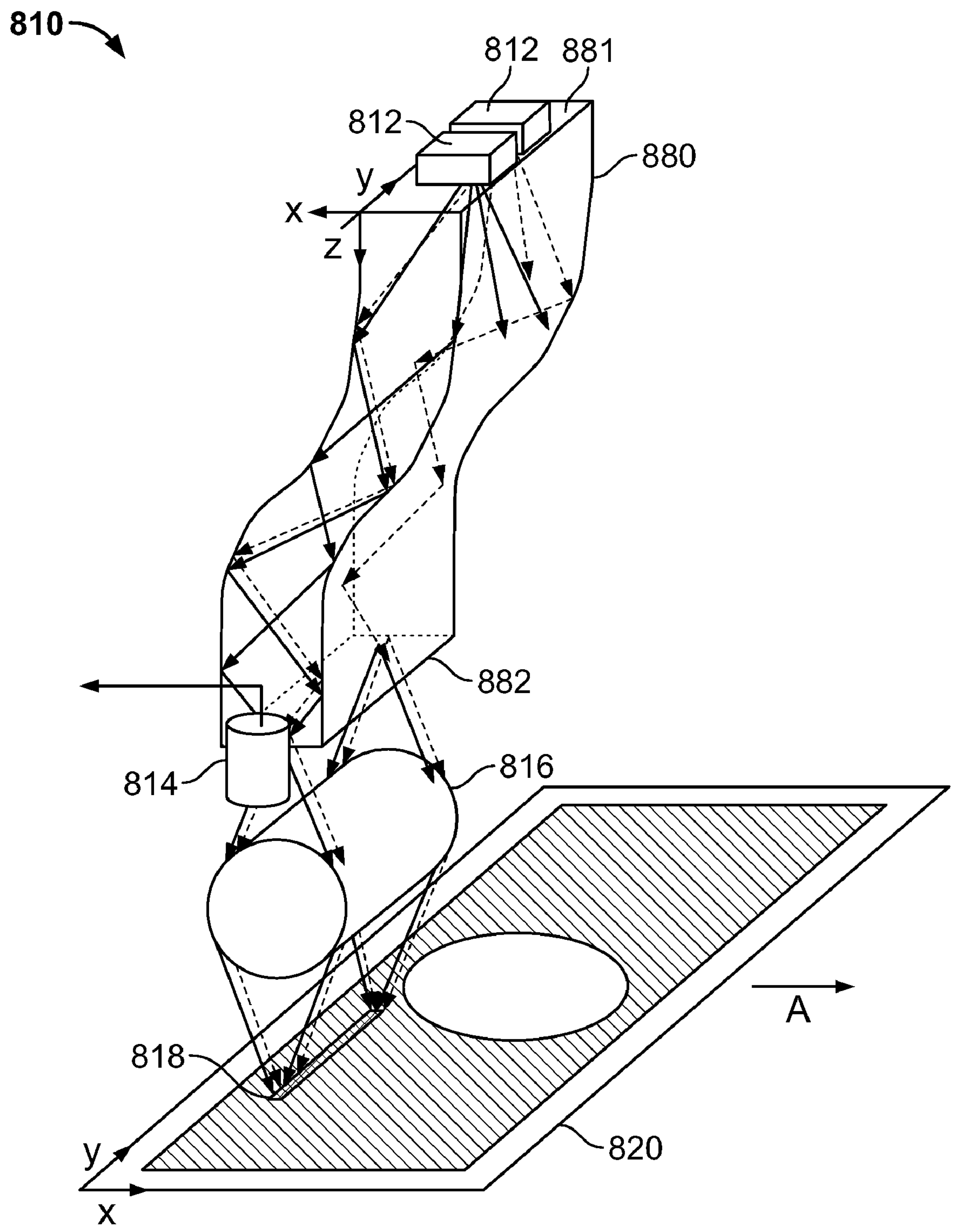
FIG. 8 is a perspective view of a currency bill sensor arrangement having a waveguide according to some embodiments.

Referring to FIG. 8, a currency bill sensor arrangement 810 ("sensor arrangement") is shown according to some embodiments. The sensor arrangement 810 includes two light sources 812, a photodetector 814, a cylindrical lens 816, and a waveguide 880. The two light sources 812 emit two different wavelengths of light in a similar manner as described above in FIG. 2. According to some embodiments, instead of including two separate light sources, the sensor arrangement 810 can include one light source (e.g., multi-wavelength light source 313, 613, 653) that is capable of emitting two or more wavelengths of light. The waveguide 880 can also be referred to as a slab waveguide or a lightguide. According to some embodiments, the waveguide 880 receives light emitted from the light sources 812 at a first end 881 and outputs light from a second end 882 of the waveguide 880, thereby directing or focusing the received light onto a cylindrical lens 816. The waveguide 880 can be used to multiplex two or more wavelengths of light in time. The waveguide can also serve to couple remotely located light sources (e.g., light sources 812) with a cylindrical lens.

According to some embodiments, the light received by the cylindrical lens 816 is directed onto a top surface of a bill 820. The bill 820 is moved along a transport path in the direction of arrow A. The cylindrical lens 816 directs the light such that an elongated strip of light 818 is incident upon the top surface of the bill 820. The elongated strip of light 818 can be formed of one wavelength of light or a mixture of two or more wavelengths of light. According to some embodiments, the waveguide 880 directs light and allows light to expand in one dimension by propagating light through the waveguide 880 from the first end 881 to the second end 882 via internal reflection. For example, the waveguide 880 is structured with certain dimensions (e.g., length, width, height) such that light can expand in a Y dimension. Such a property of the waveguide 880 allows for the use of a point light source, such as light source 812, to be used such that the point light source 812 is still capable of illuminating a bill with an elongated strip of light. More specifically, the waveguide 880 directs a sufficient amount of expanded light onto the cylindrical lens 816 such that the cylindrical lens 816 directs the elongated strip of light 818 with an intensity sufficient for processing the bill 820.

The two different wavelengths of light emitted from light sources 812 are shown with solid and dashed arrows. According to some embodiments, the waveguide 880 is rectangular or tapered in any of the X, Y, or Z dimensions. Such a taper can produce an elongated strip of light having a desired dimension suitable for a particular application (e.g., denomination, authentication, edge detection, etc.).

According to some embodiments, a portion of light reflected from the bill 820 is received by the cylindrical lens 816. The photodetector 814 is positioned to receive a portion of the reflected light from the cylindrical lens 816. The photodetector 814 generates or produces an electrical signal in the same or similar manner as described above.

According to some embodiments, a second sub-sensor arrangement (e.g., sensor arrangement 150) can be positioned on an opposite side of the transport path to simultaneously detect reflected and transmitted light in the same, or similar, manner as described above in relation to FIGS. 5 and 6. According to some embodiments, such a second sub-sensor arrangement includes a waveguide, one or more light sources, a cylindrical lens, and a photodetector, all similar to, or the same as, the waveguide 880, the light sources 812, the cylindrical lens 816, and the photodetector 814 of the sensor arrangement 810.

Figure 9:
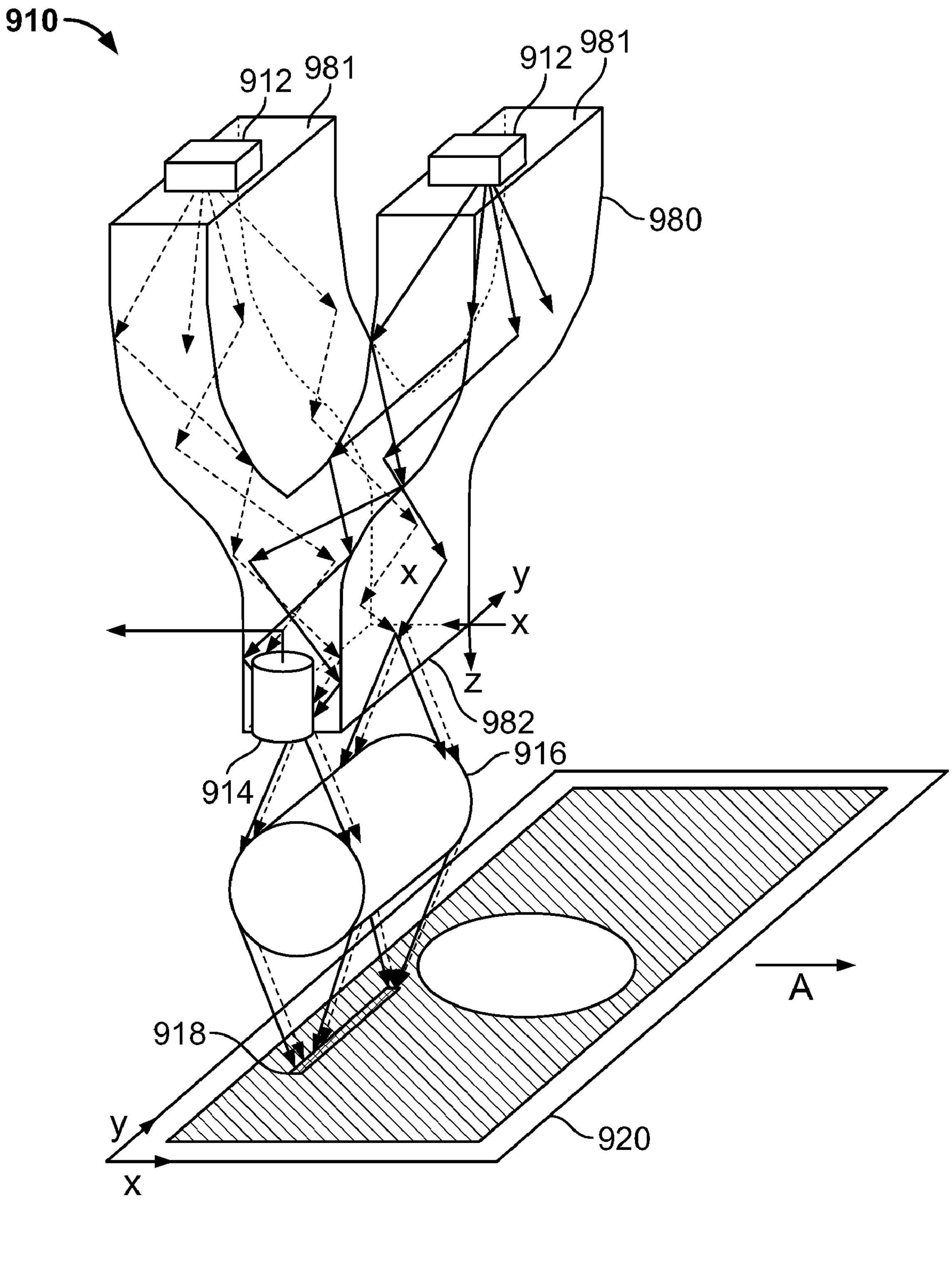
FIG. 9 is a perspective view of a currency bill sensor arrangement having a waveguide according to some embodiments.

Referring to FIG. 9, a currency bill sensor arrangement 910 ("sensor arrangement") is shown according to some embodiments. The sensor arrangement 910 includes two light sources 912, a photodetector 914, a cylindrical lens 916, and a Y-branch waveguide 980. The two light sources 912 emit two different wavelengths of light in a similar manner as described above in FIG. 2. According to some embodiments, the Y-branch waveguide 980 is separated in a thin direction such that two arms of the waveguide 980 are side-by-side in an X dimension. According to some embodiments, the two arms of the Y-branch waveguide 980 each receives light emitted from a different one of the light sources 912 at a respective first end 981 of the waveguide 980. The waveguide 980 outputs the received light from a second end 982 of the waveguide 980, thereby directing or focusing the received light onto a cylindrical lens 916.

According to some embodiments, a bill 920 is moved along a transport path in the direction of arrow A. The cylindrical lens 916 directs or focuses the received light such that an elongated strip of light 918 is incident upon a top surface of the bill 920. According to some embodiments, the Y-branch waveguide 980 directs light and allows light to expand in a Y dimension by propagating light through the two arms of the Y-branch waveguide 980 from the first end 981 to the second end 982 via internal reflection. Additionally, the Y-branch waveguide 980 is configured to multiplex the light emitted from the two light sources 912 such that the light emitted from both light sources 912 comes out of the second end 982 in substantially the same manner (e.g., incident on substantially the full length of the cylindrical lens 916).

The two different wavelengths of light emitted from light sources 912 are shown with solid and dashed arrows. According to some embodiments, a portion of light reflected from the bill 920 is received by the cylindrical lens 916. The photodetector 914 is positioned to receive a portion of the reflected light from the cylindrical lens 916. The photodetector 914 generates or produces an electrical signal in the same, or similar, manner as described above. According to some embodiments, a second sub-sensor arrangement (e.g., sensor arrangement 150) can be positioned on an opposite side of the transport path to simultaneously detect reflected and transmitted light in the same or similar manner as described above in relation to FIGS. 5 and 6. According to some embodiments, the second sub-sensor arrangement is similar to, or the same as, the sensor arrangement 910 shown in FIG. 9, which includes the waveguide 980, the light sources 912, the cylindrical lens 916, and the photodetector 914.

Figure 10:
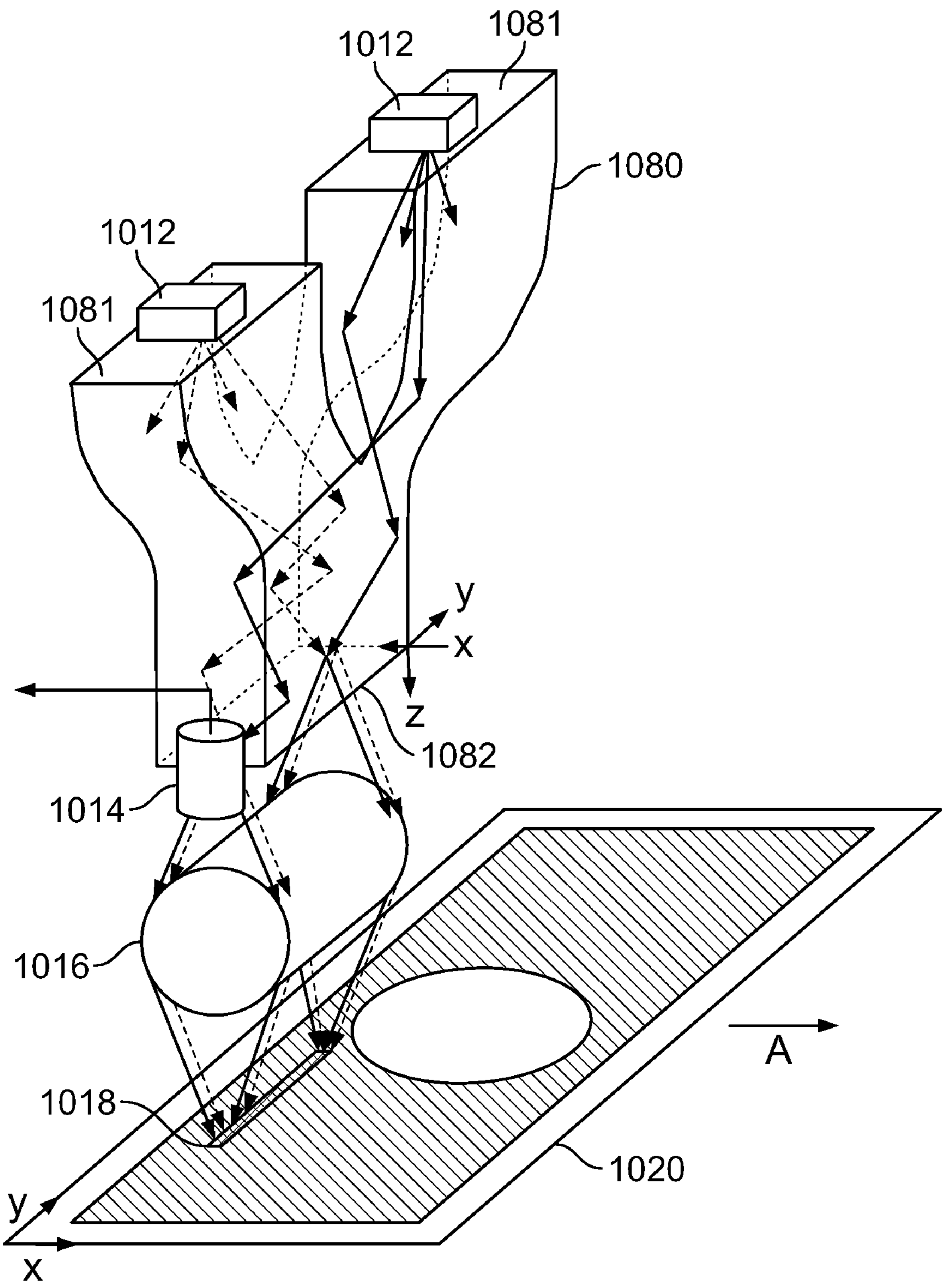
FIG. 10 is a perspective view of a currency bill sensor arrangement having a waveguide according to some embodiments.

Referring to FIG. 10, a currency bill sensor arrangement 1010 ("sensor arrangement") is shown according to some embodiments. The sensor arrangement 1010 includes two light sources 1012, a photodetector 1014, a cylindrical lens 1016, and a Y-branch waveguide 1080. The sensor arrangement 1010 is the same as the sensor arrangement 910 shown in FIG. 9; however, the Y-branch waveguide 1010 is modified. Specifically, the Y-branch waveguide 1010 is separated in a thick direction such that two arms of the waveguide 1080 are side-by-side in an Y dimension. The sensor arrangement 1010 can be implemented in the same manner as the sensor arrangement 910 described above.

Figure 11:
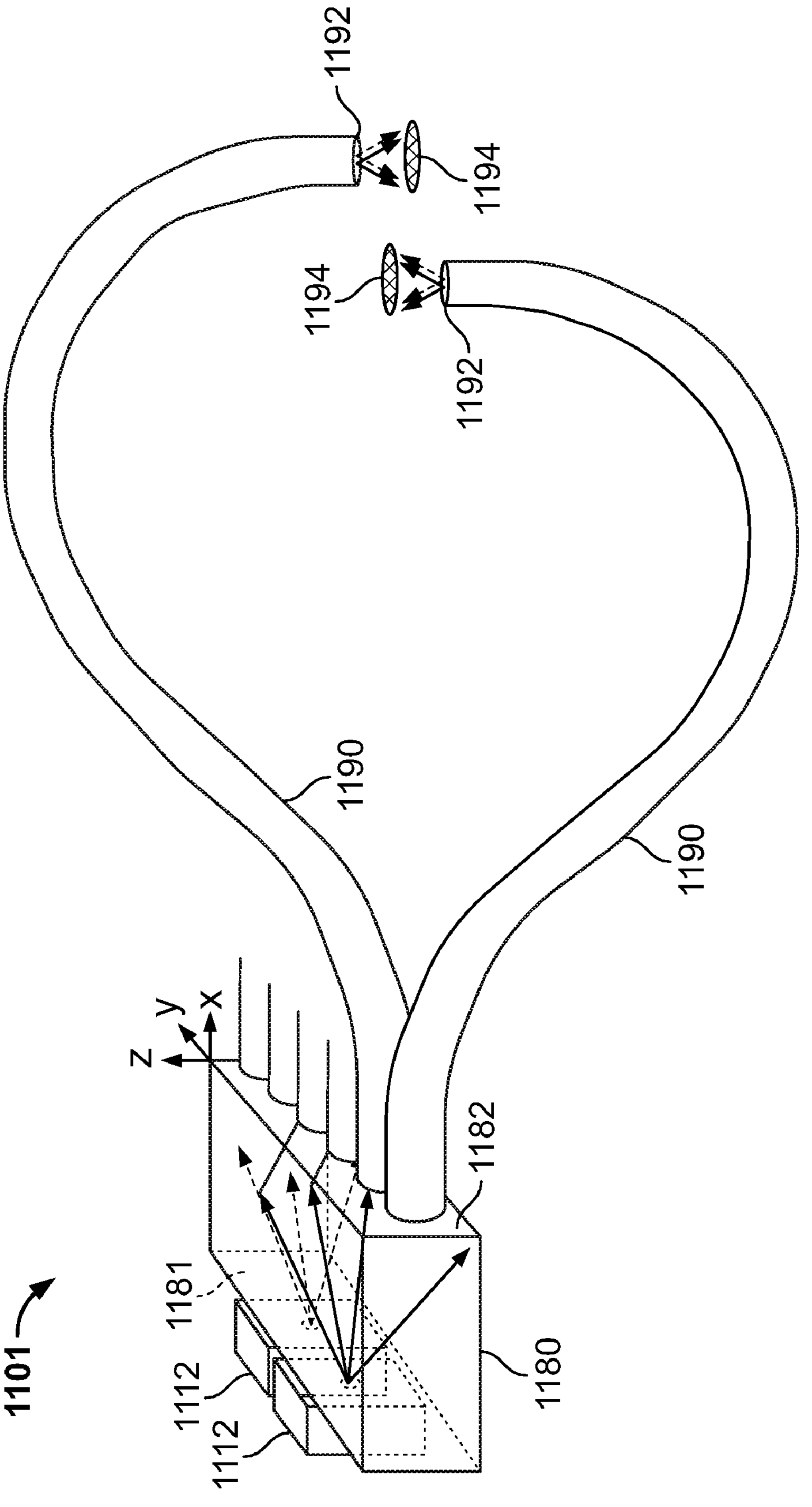
FIG. 11 is a perspective view of a light distribution system having a slab waveguide.

Referring to FIG. 11, a light distribution system 1101 is shown according to some embodiments. The light distribution system 1101 includes two light sources 1112, a slab waveguide 1180, and a plurality of optical fibers 1190. The light distribution system 1101 can be used to multiplex light emitted from the two light sources 1112 and direct the emitted light onto one or more cylindrical lenses (e.g., cylindrical lens 216, 316, 516,556, 616, 656, 816, 916, 1016).

According to some embodiments, the two light sources 1112 emit two different wavelengths of light in a similar manner as described above in FIG. 2. According to some embodiments, instead of including two separate light sources, the light distribution system 1101 can include one light source (e.g., multi-wavelength light source 313, 613, 653) that is capable of emitting two or more wavelengths of light. According to some embodiments, the slab waveguide 1180 receives light emitted from the light sources 1112 at a first end 1181 and outputs light from a second end 1182 of the slab waveguide 1180, thereby directing or focusing the received light onto the plurality of optical fibers 1190. The waveguide 1180 can be used to multiplex two or more wavelengths of light in time.

According to some embodiments, the slab waveguide 1180 directs light and allows light to expand in a Y dimension by propagating light through the slab waveguide 1180 from the first end 1181 to the second end 1182 via internal reflection. For example, the slab waveguide 1180 is structured with certain dimensions (e.g., length, width, height) such that light can expand in the Y dimension but not a Z dimension. Specifically, the slab waveguide 1180 is wider in the Y dimension than in the Z dimension to prevent light from escaping from a top or a bottom surface of the slab waveguide 1180.

According to some embodiments, the slab waveguide 1180 is either rectangular, or is tapered in either the X, Y, or Z dimensions to allow the emitted light to expand enough such that each of the plurality of optical fibers 1190 receives a sufficient amount of light and to increase the overall light coupling efficiency between the slab waveguide 1180, the plurality of optical fiber 1190, and the light sources 1112. According to some embodiments, the plurality of optical fibers 1190 can be used to distribute light to a plurality of sensor arrangements. The light exits the plurality of optical fibers 1190 at an end surface 1192 and expands to produce a round spot of light 1194.

Figure 12:
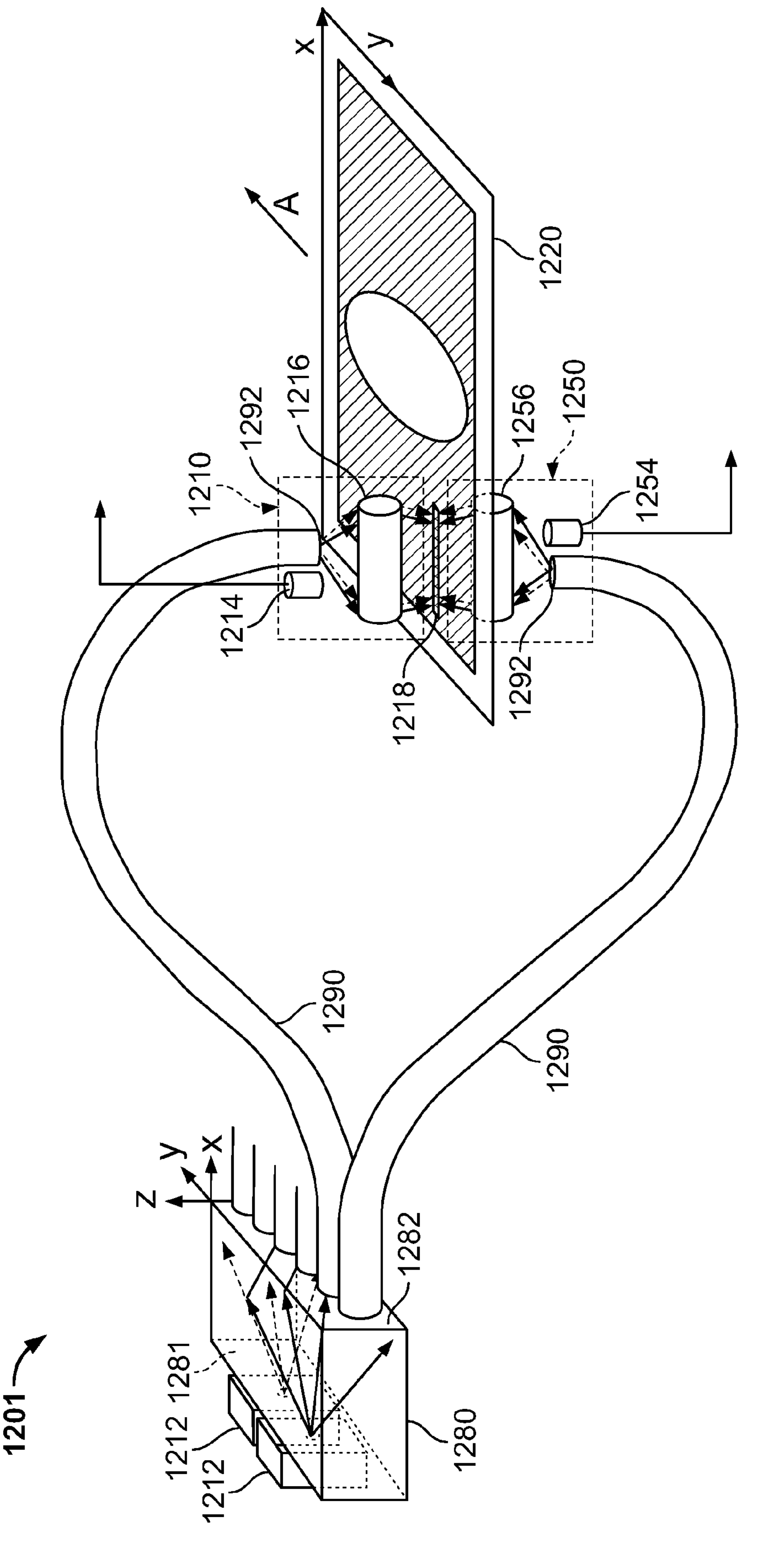
FIG. 12 is a perspective view of the light distribution system of FIG. 11 illuminating a pair of cylindrical lens of two currency bill sensor arrangements.

Referring to FIG. 12, a light distribution system 1201 is shown according to some embodiments. The light distribution system 1201 includes two light sources 1212, a slab waveguide 1280, and a plurality of optical fibers 1290. The light distribution system 1201 can direct and/or distribute light emitted from the two light sources 1212 into one or more currency bill sensor arrangements. As shown in FIG. 12, two of the plurality of optical fibers 1290 direct light into a first sensor arrangement 1210 and into a second sensor arrangement 1250. The light distribution system 1201 is the same as, or similar to, the light distribution system 1101 described above. The first and second opposing sensor arrangement is similar to, or the same as, the sensor arrangements described above in relation to FIGS. 5 and 6.

According to some embodiments, the first sensor arrangement 1210 includes a photodetector 1214 and a cylindrical lens 1216; the second sensor arrangement 1250 includes a photodetector 1254 and a cylindrical lens 1256. The first and second sensor arrangements 1210, 1250 are positioned on opposite sides of a bill 1220 being sensed to simultaneously measure light transmission and light reflection in a similar manner as described above. The bill 1220 is being transported by a transport mechanism (e.g., transport mechanism 104) along a transport path in the direction of arrow A.

According to some embodiments, multi-wavelength light is emitted from an end surface 1292 of the optical fibers 1290. The emitted light expands in both an X dimension and a Y dimension and is directed or focused in the Y dimension by the cylindrical lens 1216, 1256, thus forming an elongated strip of light 1218 on the bill 1220. As described above, the scattered and/or reflected light is received or collected by the cylindrical lenses 1216, 1256, and focused onto the respective photodetector 1214, 1254. According to some embodiments, a portion of emitted light can be transmitted through the bill 1220, and collected by an opposing cylindrical lens in a similar manner as described above in relation to FIGS. 5 and 6.

According to some embodiments, the photodetectors 1214, 1254 generate or produce an electrical signal, similar to the electrical signals discussed above. Using the modulation and detection schemes described above and shown in FIGS. 1-6, a reflectance signal, a transmittance signal, a reflectance difference $\Delta_R$, and a transmitted difference $\Delta_T$ can be obtained by modulating the light sources 1212 and by using digital and/or analog processing of the electrical signals as described above in relation to FIGS. 3 and 6.

Figure 13:
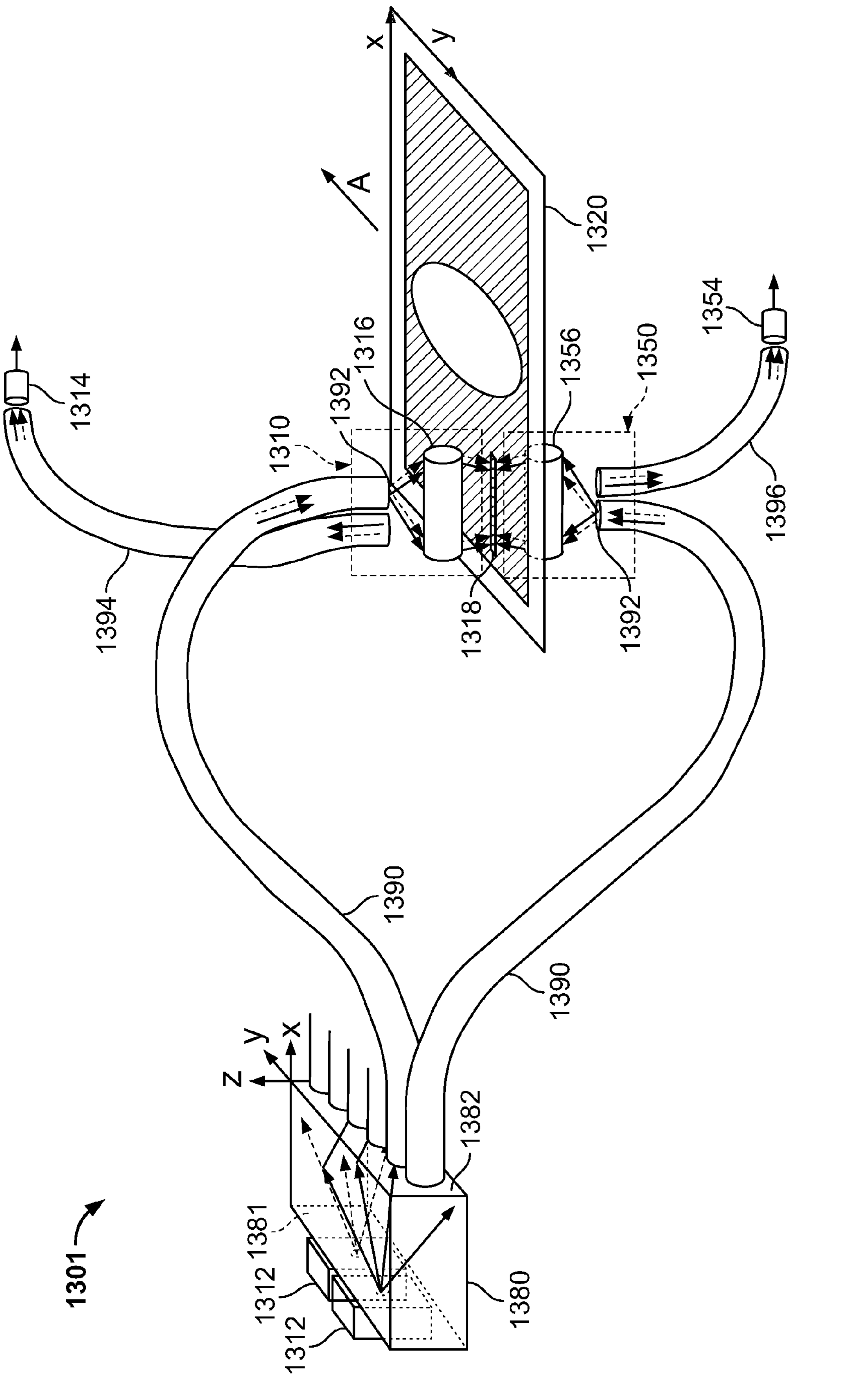
FIG. 13 is a perspective view of the light distribution system of FIG. 11 illuminating a pair of cylindrical lens of two currency bill sensor arrangements further including optical fibers.

Referring to FIG. 13, a light distribution system 1301 is shown according to some embodiments. The light distribution system 1301 includes two light sources 1312, a slab waveguide 1380, and a plurality of optical fibers 1390. The light distribution system 1301 can direct and/or distribute light emitted from the two light sources 1312 into one or more currency bill sensor arrangements. As shown in FIG. 13, two of the plurality of optical fibers 1390 direct light into a first sensor arrangement 1310 and into a second sensor arrangement 1350. The light distribution system 1301 is the same as, or similar to, the light distribution systems 1101, 1201 described above. The first and second opposing sensor arrangement is similar to, or the same as, the sensor arrangements described above in relation to FIGS. 5 and 6.

According to some embodiments, the first sensor arrangement 1310 includes a remote photodetector 1314 and a cylindrical lens 1316; the second sensor arrangement 1350 includes a remote photodetector 1354 and a cylindrical lens 1356. The first and second sensor arrangements 1310, 1350 are positioned on opposite sides of a bill 1320 being sensed to simultaneously measure light transmission and light reflection in a similar manner as described above. The bill 1320 is being transported by a transport mechanism (e.g., transport mechanism 104) along a transport path in the direction of arrow A.

According to some embodiments, multi-wavelength light is emitted from an end surface 1392 of the optical fibers 1390. The emitted light expands in both an X dimension and a Y dimension and is directed or focused in the Y dimension by the cylindrical lens 1316, 1356, thus forming an elongated strip of light 1318 on the bill 1320. As described above, the scattered and/or reflected light is received or collected by the cylindrical lenses 1316, 1356. A portion of the received light is directed and/or focused onto the respective remote photodetector 1314, 1354 via optical fibers 1394, 1396. According to some embodiments, a portion of emitted light can be transmitted through the bill 1320, and collected by a opposing cylindrical lens in a similar manner as described above in relation to FIGS. 5 and 6.

According to some embodiments, the photodetectors 1314, 1354 generate or produce an electrical signal, similar to the electrical signals discussed above. Using the modulation and detection schemes described above and shown in FIGS. 1-6, a reflectance signal, a transmittance signal, a reflectance difference $\Delta_R$, and a transmitted difference $\Delta_T$ can be obtained by modulating the light sources 1312 and by using digital and/or analog processing of the electrical signals as described above in relation to FIGS. 3 and 6.

According to some embodiments disclosed herein, reflectance and/or transmittance averaging and difference A calculations can either be implemented in analog circuit or a digital circuit. According to some embodiments, if a digital circuit is used, the electrical signal (e.g., electrical signal 230, 330, 430, etc.) generated by the photodetector (e.g., photodetector 214, 314, 413, etc.) is digitized via an analog-to-digital converter. According to some embodiments, analog implementation of wavelength separation can be achieved using a sample and hold circuit and difference amplifiers, or any variety of analog circuits that achieve phase shifting as depicted in FIG. 3 and FIG. 6.

Some of the above described embodiments, illustrated in FIGS. 2-3, 5-6, 8-10, and 12-13, depict a bill (e.g., bill 220, 320, 520, 620, 820, 920, 1020, 1220, and 1320) being transported with a wider edge of the bill leading in a direction of arrow A. It is contemplated that the bill can be transported with a narrower edge of the bill leading in the direction of arrow A for any of the above described embodiments.

According to some embodiments, two or more light sources emit two or more wavelengths of light. For example, one of the two light sources 212 can emit a first wavelength of light and the other can emit a second wavelength of light. For another example, the multi-wavelength light source 313 can emit two or more wavelengths of light. For any of the above described sensor arrangements (e.g., sensor arrangement 210, 310, 510, 550, 610, 650, 810, 910, 1010, 1210, 1250, 1310, and 1350) the reflected and/or transmitted electrical signals (e.g., electrical signal 230, 530, 560, etc.) can be calibrated and/or equated to produce normalized results, which can increase the accuracy of the sensor arrangement. For example, calibrating the light sources to be equated can increase the accuracy of a face-orientation determination.

According to some embodiments, calibrating the light sources can be achieved by directing and/or focusing each wavelength of light in an empty sensor arrangement to obtain an initial reflection signal (e.g., electrical signal 230) and/or an initial transmittance signal (e.g., electrical signal 560). Namely, the sensor arrangements are calibrated when there is no bill or paper present adjacent the sensor arrangement. According to some embodiments, the sensor arrangements (e.g., sensor arrangement 210, 510, 560, etc.) can be calibrated using background reflections, such as reflections from a cylindrical lens (e.g., cylindrical lenses 216, 316, etc.). According to some embodiments, the sensor arrangements can be calibrated using hardware control, such as by using adjustable electronic potentiometers and/or by using software control.

According to some embodiments, hardware controls are used to adjust current flowing through each light source (e.g., light sources 212), thereby calibrating a first wavelength reflected and/or transmitted signal and a second wavelength reflected and/or transmitted signal when there is no bill adjacent the sensor arrangement. In these embodiments, the current flowing through each light source is adjusted until the reflected and/or transmitted electrical signals (e.g., electrical signal 230, 530, 560, etc.) are equated for both light sources. According to some embodiments, a sensor arrangement can be calibrated initially, periodically, between processing of stacks of bills, at random intervals of time, after processing a predetermined milestone of bills, or any combinations thereof.

According to some embodiments, a sensor arrangement includes software controls that can be used to normalize reflected and/or transmitted signals for two or more light sources after the signals are generated and/or collected in, for example, a controller or a processor or a computer. In these embodiments, a first wavelength signal, a second wavelength signal, or both the first and second wavelength signals can be multiplied by a constant to normalize the signals to increase the accuracy of the sensor arrangement. According to some embodiments, a multiplication constant can be used to adjust a first and second reflected signal and/or a first and second transmitted signal to normalize the signals such that if there was no bill present the first and second signals would be equal.

FURTHER ALTERNATIVE EMBODIMENTS

Alternative Embodiment A

Embodiment A1

According to some embodiments, a sensor system consisting of multiple light emitting diodes (LEDs) and a rod lens a photo-detector and analog and digital electronics.

Embodiment A2

The sensor according to embodiment A1 using one multi-wavelength LED instead of multiple LEDs.

Embodiment A3

The sensor according to embodiment A1 that is used for banknote denomination.

Embodiment A4

The sensor according to embodiment A1 that is used for banknote or document authentication.

Embodiment A5

The sensor according to embodiment A1 that is used for banknote or document edge detecting.

Embodiment A6

The sensor according to embodiment A1 that is used for banknote or document print edge detecting.

Embodiment A7

The sensor according to embodiment A1 that uses two or more light wavelengths, detects the difference in reflectance between the two wavelengths to determine the incident side of the banknote.

Embodiment A8

The sensor according to embodiment A1 that is used to measure the density of the banknote or document.

Embodiment A9

The sensor according to embodiment A1 that is used to measure the width of the banknote or document.

Embodiment A10

The sensor according to embodiment A1 that is used to determine the fitness of the banknote or document.

Alternative Embodiment B

Embodiment B1

According to some embodiments, a sensor system consisting of one or more LED or a laser diode (LD) used as an excitation source, a rod lens and a photo-detector, a rectangular slab waveguide, and analog and digital electronics.

Embodiment B2

The sensor according to embodiment B1 that illuminates fibers embedded inside a banknote or a security document with a visible light from LED or LD, and detects infrared emission from the fibers.

Embodiment B3

The sensor according to embodiment B1 that utilizes Y-junction waveguide splitter.

Alternative Embodiment C

Embodiment C1

According to some embodiments, a sensor system consisting of one or more LED or a laser diode (LD) used as excitation source, a rod lens and a photo-detector, an optical filter, and analog and digital electronics.

Embodiment C2

The sensor according to embodiment C1 that illuminates fibers embedded inside a banknote or a security document with a visible light from LED or LD, and detects infrared emission from the fibers.

Alternative Embodiment D

Embodiment D1

According to some embodiments, a sensor system consisting of multiple infrared light emitting diodes (LEDs) and a rod lens, a photo-detector, and analog and digital electronics.

Embodiment D2

The sensor according to embodiment D1 that uses two or more infrared wavelengths, detects the difference in reflectance between the two wavelengths to authenticate a banknote or a security document.

Alternative Embodiment E

According to some embodiments, a multi-function sensing system that combines sensors described in embodiments A, B, C and D, that perform some or all the functions described in each of the subsequent embodiments.

Alternative Embodiment F

According to some embodiments a currency processing device for receiving a stack of U.S. currency bills and rapidly processing all the bills in the stack, the device comprising: an input receptacle adapted to receive a stack of U.S. currency bills of a plurality of denominations, the currency bills having a wide dimension and a narrow dimension; a transport mechanism positioned to transport the bills, one at a time, in a transport direction from the input receptacle along a transport path at a rate of at least about 1000 bills per minute with the narrow dimension of the bills parallel to the transport direction; a currency bill sensor arrangement positioned along the transport path, the currency bill sensor comprising: i) a multi-wavelength light source configured to emit a first wavelength of light and a second wavelength of light; ii) a cylindrical lens positioned to receive the first and second wavelengths of light from the multi-wavelength light source, the cylindrical lens illuminating an elongated strip of light on a surface of one of the plurality of currency bills, the cylindrical lens being configured to receive light reflected from the surface of the one of the plurality of currency bills; iii) a photodetector positioned to receive the reflected light, the photodetector generating an electrical signal in response to the received reflected light; iv) a processor configured to receive the electrical signal generated by the photodetector; wherein, the processor is configured to determine whether the surface of the one of the plurality of currency bills is a primary surface or a secondary surface based on the electrical signal.

Alternative Embodiment G

According to some embodiments, a U.S. currency processing device for receiving a stack of U.S. currency bills and rapidly processing all the bills in the stack, the device comprising: an input receptacle positioned to receive a stack of U.S. bills of a plurality of denominations, the bills having a narrow dimension and a wide dimension; a transport mechanism comprising a transport drive motor and transport rollers, the transport mechanism being positioned to transport the bills, one at a time, from the input receptacle along a transport path in a transport direction; a currency bill sensor arrangement positioned along the transport path, the currency bill sensor comprising: i) a first light source; ii) a second light source; iii) a controller configured to modulate the first and second light sources on and off in an alternating manner; iv) a cylindrical lens positioned to receive modulated light from the first and second light sources, the cylindrical lens having light focusing characteristics in one direction that illuminates an elongated strip of the modulated light onto a surface of one of the plurality of currency bills, the cylindrical lens being positioned to receive modulated light reflected from the surface of the currency bill; v) a photodetector positioned to receive the reflected modulated light from the cylindrical lens, the photodetector generating an electrical signal in response to the received reflected modulated light; vi) a processor configured to receive the electrical signal generated by the photodetector; wherein, the processor is configured to determine whether the surface of the one of the plurality of currency bills is a primary surface or a secondary surface based on the electrical signal.

Alternative Embodiment H

According to some embodiments, a currency processing device, comprising: an input receptacle configured to receive a stack of currency bills; a transport mechanism configured to move the currency bills in a serial manner along a transport path; a currency bill sensor arrangement positioned along the transport path, the currency bill sensor comprising: i) a multi-wavelength light source configured to emit a first wavelength of light and a second wavelength of light; ii) a cylindrical lens positioned adjacent the transport path and is configured to receive the first and second wavelengths of light from the multi-wavelength light source, the cylindrical lens illuminating an elongated strip of light on a surface of one of the plurality of currency bills, the cylindrical lens being configured to receive light reflected from the surface of the one of the plurality of currency bills; iii) a photodetector positioned to receive the reflected light, the photodetector generating an electrical signal in response to the received reflected light; iv) a processor configured to receive the electrical signal generated by the photodetector; wherein, the processor is configured to determine whether the surface of the one of the plurality of currency bills is a primary surface or a secondary surface based on the electrical signal.

Alternative Embodiment I

According to some embodiments, a currency bill sensing system, the sensor comprising: a first light source; a second light source; a controller configured to modulate the first and second light sources on and off in an alternating manner; a cylindrical lens positioned to receive modulated light from the first and second light sources, the cylindrical lens directing the modulated light onto a surface of a currency bill having two opposing surfaces including a primary surface and a secondary surface, the cylindrical lens being positioned to receive modulated light reflected from the currency bill; a photodetector positioned to receive the reflected modulated light from the cylindrical lens, the photodetector generating an electrical signal in response to the received reflected modulated light; and a processor configured to receive the electrical signal generated by the photodetector; wherein the processor is configured to determine whether the surface of the currency bill is the primary surface or the secondary surface based on the electrical signal.

Alternative Embodiment J

According to some embodiments, a currency bill sensing system, comprising: a red light emitting diode; a green light emitting diode; a cylindrical lens positioned to receive red and green light from the red and green light emitting diodes, the cylindrical lens having light focusing characteristics in one direction that illuminates an elongated strip of the red or green light onto a surface of a currency bill, the cylindrical lens being positioned to receive red and green light reflected from the currency bill; and a photodetector positioned to receive the reflected red and reflected green light from the cylindrical lens; wherein the photodetector is positioned between the red light emitting diode and the green light emitting diode, the photodetector, the red light emitting diode, and the green light emitting diode being positioned above a surface of the currency bill, the cylindrical lens being positioned between the photodetector and the surface of the currency bill to facilitate the illumination of the elongated strip of red or green light.

Alternative Embodiment K

According to some embodiments, a currency bill sensing system, comprising: a first optical sensor comprising: i) one or more first light sources for emitting a first wavelength of light and a second wavelength of light; ii) a first cylindrical lens; iii) a first photodetector; a second optical sensor comprising: i) one or more second light sources for emitting the first wavelength of light and the second wavelength of light; ii) a second cylindrical lens; iii) a second photodetector; and a controller for modulating the one or more first light sources and the one or more second light sources on and off in an alternating manner such that only one light source emits only one wavelength of light at any given moment; wherein the first cylindrical lens receives modulated light from the one or more first light sources; the first cylindrical lens being positioned to direct the modulated light onto a first surface of a currency bill, the first cylindrical lens further being positioned to receive modulated light reflected from the first surface of the currency bill; and wherein the second cylindrical lens is positioned to receive modulated light from the one or more second light sources; the second cylindrical lens being positioned to direct the modulated light onto a second surface of the currency bill; the second cylindrical lens further being positioned to receive modulated light reflected from the second surface of the currency bill.

Alternative Embodiment L

According to some embodiments, a currency bill sensing system, comprising: a multi-wavelength light emitting diode arrangement configured to emit a first wavelength of light, a second wavelength of light, and a third wavelength of light; a cylindrical lens for receiving the first, second, and third wavelengths of light from the multi-wavelength light emitting diode arrangement, the cylindrical lens having light focusing characteristics in one direction for illuminating an elongated strip of light onto a surface of a currency bill, the cylindrical lens being configured to receive light reflected from the currency bill; and a photodetector positioned to receive the reflected light from the cylindrical lens; wherein the photodetector is positioned adjacent the multi-wavelength light emitting diode arrangement, the cylindrical lens being positioned between the photodetector and the surface of the currency bill to facilitate the illumination of the elongated strip of light.

Alternative Embodiment M

According to some embodiments, a currency bill sensing system, comprising: a first wavelength light source; a second wavelength light source; a controller for modulating the first and second wavelength light sources on and off in an alternating manner; a waveguide for guiding the first and second wavelength light, the waveguide having a first end and a second end; a cylindrical lens for receiving modulated light from the second end of the waveguide, the cylindrical lens directing the modulated light onto a surface of a currency bill having two opposing surfaces including a primary surface and a secondary surface, the cylindrical lens further receiving modulated light reflected from a surface of the currency bill; and a photodetector for receiving a portion of the reflected modulated light from the cylindrical lens, the photodetector adjacent the waveguide; wherein the first and second wavelength light sources are coupled to the first end of the waveguide such that substantially all of the emitted light enters the first end of the waveguide.

Alternative Embodiment N

The currency processing device according to any of alternative embodiments F and H, further comprising a controller configured to modulate the first and second wavelengths of light on and off in an alternating manner.

Alternative Embodiment O

Embodiment O1

The currency processing device according to any of alternative embodiments F and H and the system according to any of alternative embodiments K, L, and M, wherein the first and second wavelengths of light are visible light.

Embodiment O2

The currency processing device according to any of alternative embodiments F and H and the system according to any of alternative embodiments K, L, and M, wherein the first and second wavelengths of light are visible wavelengths, infrared wavelengths, ultraviolet wavelengths, or any combinations thereof.

Alternative Embodiment P

The currency processing device according to any of alternative embodiments F, G, and H, further comprising one or more output receptacles positioned to receive currency bills from the transport mechanism after the currency bills pass the currency bill sensor arrangement.

Alternative Embodiment Q

Embodiment Q1

The currency processing device according to any of alternative embodiments F, G, and H and the system according to alternative embodiment I, wherein the processor is further configured to denominate the plurality of currency bills based on the electrical signal at a rate in excess of 500 bills per minute.

Embodiment Q2

The currency processing device according to any of alternative embodiments F, G, and H and the system according to alternative embodiment I, wherein the processor is further configured to denominate the plurality of currency bills based on the electrical signal at a rate in excess of 1000 bills per minute.

Alternative Embodiment R

The currency processing device according to any of alternative embodiments F, G, and H and the system according to alternative embodiment I, wherein the processor is further configured to denominate the plurality of currency bills based on the electrical signal at a rate in excess of 1500 bills per minute.

Alternative Embodiment S

The currency processing device according to any of alternative embodiments F, G, and H and the system according to alternative embodiment I, wherein the processor is further configured to denominate the plurality of currency bills based on the electrical signal at a rate in excess of 2400 bills per minute.

Alternative Embodiment T

The currency processing device according to any of alternative embodiments F, G, and H, and the system according to alternative embodiment I, wherein the processor is further configured to determine a series of the currency bills based on the electrical signal.

Alternative Embodiment U

The currency processing device according to any of alternative embodiments F and H and the system according to any of alternative embodiments K and M, wherein the first wavelength of light is between about 520 nanometers and 580 nanometers.

Alternative Embodiment V

The currency processing device according to any of alternative embodiments F and H and the system according to any of alternative embodiments K and M, wherein the second wavelength of light is between about 605 nanometers and 665 nanometers.

Alternative Embodiment W

The currency processing device according to any of alternative embodiments F and H and the system according to any of alternative embodiments K and M, wherein the first wavelength of light is about 550 nanometers.

Alternative Embodiment X

The currency processing device according to any of alternative embodiments F and H and the system according to any of alternative embodiments K and M, wherein the first wavelength of light is green light.

Alternative Embodiment Y

The currency processing device according to any of alternative embodiments F and H and the system according to any of alternative embodiments K and M, wherein the second wavelength of light is about 635 nanometers.

Alternative Embodiment Z

The currency processing device according to any of alternative embodiments F and H and the system according to any of alternative embodiments K and M, wherein the second wavelength of light is red light.

Alternative Embodiment AA

The currency processing device according to any of alternative embodiments F and H and the system according to any of alternative embodiments K and M, wherein the second wavelength of light is about 450 nanometers.

Alternative Embodiment BB

The currency processing device according to any of alternative embodiments F and H and the system according to any of alternative embodiments K and M, wherein the second wavelength of light is blue light.

Alternative Embodiment CC

The currency processing device according to any of alternative embodiments F and H, wherein the multi-wavelength light source is further configured to emit a third wavelength of light, the first wavelength of light is red light, the second wavelength of light is green light, the third wavelength of light is blue light.

Alternative Embodiment DD

The currency processing device according to any of alternative embodiments G and H, wherein the transport mechanism is adapted to transport the bills at a rate in excess of 1000 bills per minute with their narrow dimension parallel to the transport direction.

Alternative Embodiment EE

The currency processing device according to any of alternative embodiments F, G, and H, wherein the transport mechanism is adapted to transport the bills at a rate in excess of 1500 bills per minute with their narrow dimension parallel to the transport direction.

Alternative Embodiment FF

The currency processing device according to any of alternative embodiments F, G, and H, wherein the transport mechanism is adapted to transport the bills at a rate in excess of 2400 bills per minute with their narrow dimension parallel to the transport direction.

Alternative Embodiment GG

The currency processing device according to any of alternative embodiments F, G, and H, and the system according to alternative embodiment I, wherein the processor is further configured to determine a face-orientation series of the bills based on the electrical signal.

Alternative Embodiment HH

The currency processing device according to any of alternative embodiments F, G, and H, wherein the transport mechanism moves the currency bills along the transport path at a rate of at least about 1000 bills per minute and wherein the processor is configured to determine a face-orientation of the bills at a rate of 1000 bills per minute.

Alternative Embodiment II

The currency processing device according to any of alternative embodiments F, G, H, I, K, and M, wherein the light source or light sources are LED light sources.

Alternative Embodiment JJ

The currency processing device according to any of alternative embodiments F, G, and H and the system according to alternative embodiment I, wherein the processor is further configured to split the electrical signal into a first wavelength component and a second wavelength component, the processor being configured to denominate the currency bill based on at least one of the first wavelength component, the second wavelength component, or an average of the first and second wavelength components.

Alternative Embodiment KK

The currency processing device according to any of alternative embodiments F, G, and H and the system according to alternative embodiment I, wherein the processor is further configured to filter the electrical signal to produce an average reflectance signal, the processor being configured to denominate the currency bill based on the average reflectance signal.

Alternative Embodiment LL

The currency processing device according to any of alternative embodiments F, G, and H and the system according to alternative embodiment I, wherein the processor is further configured to split the electrical signal into a first wavelength reflectance component and a second wavelength reflectance component, the processor configured to determine the difference signal between the first wavelength reflectance component and the second wavelength reflectance component to be used in determining whether the surface of the currency bill is the primary surface or the secondary surface.

Alternative Embodiment MM

Embodiment MM1

The currency processing device according to any of alternative embodiments F, G, and H and the system according to alternative embodiment I, wherein the processor is further configured to split the electrical signal into a first wavelength reflectance component and a second wavelength reflectance component, the processor configured to determine the difference signal between the first wavelength reflectance component and the second wavelength reflectance component to be used in determining a series of the currency bill.

Embodiment MM2

The currency processing device according to embodiment MM1 and the system according to embodiment MM1, wherein the processor is configured to determine the series of the currency bill using the difference signal divided by an average reflectance signal.

Alternative Embodiment NN

The currency processing device according to any of alternative embodiments F, G, and H and the system according to any of alternative embodiments I, J, K, L, and M, wherein the cylindrical lens has a diameter between about 2 and 8 millimeters.

Alternative Embodiment OO

The currency processing device according to any of alternative embodiments F, G, and H and the system according to any of alternative embodiments I, J, K, L, and M, wherein the cylindrical lens has a diameter between about 3 and 6 millimeters.

Alternative Embodiment PP

The currency processing device according to any of alternative embodiments F, G, and H and the system according to any of alternative embodiments I, J, K, L, and M, wherein the cylindrical lens has a diameter of about 5 millimeters.

Alternative Embodiment QQ

The currency processing device according to any of alternative embodiments F, G, and H and the system according to any of alternative embodiments I, J, K, L, and M, wherein the cylindrical lens has a diameter of about 3.8 millimeters.

Alternative Embodiment RR

The currency processing device according to any of alternative embodiments F, G, and H and the system according to any of alternative embodiments I, J, K, L, and M, wherein the cylindrical lens has a length between about 0.25 inches and 5 inches.

Alternative Embodiment SS

The currency processing device according to any of alternative embodiments F, G, and H and the system according to any of alternative embodiments I, J, K, L, and M, wherein the cylindrical lens has a length between about 0.4 inches and 1 inch.

Alternative Embodiment TT

The currency processing device according to any of alternative embodiments F, G, and H and the system according to any of alternative embodiments I, J, K, L, and M, wherein the cylindrical lens has a length of about 0.5 inches.

Alternative Embodiment UU

Embodiment UU1

The currency processing device according to any of alternative embodiments F, G, and H and the system according to any of alternative embodiments J and L, wherein the elongated strip of light is elongated in a first direction and narrow in a second direction.

Embodiment UU2

The currency processing device according to embodiment UU1 and the system according to embodiment UU1, wherein the first direction is perpendicular to a direction of movement of the currency bill.

Alternative Embodiment VV

The currency processing device according to any of alternative embodiments F, G, and H and the system according to any of alternative embodiments J and L, wherein the elongated strip of light is perpendicular to a direction of movement of the currency bill.

Alternative Embodiment WW

The currency processing device according to any of alternative embodiments F, G, and H and the system according to any of alternative embodiments J and L, wherein the elongated strip of light has a first dimension and a second dimension, the first dimension being between about 6 millimeters and 50 millimeters.

Alternative Embodiment XX

The currency processing device according to any of alternative embodiments F, G, and H and the system according to any of alternative embodiments J and L, wherein the elongated strip of light has a first dimension and a second dimension, the second dimension being between about 2 millimeter and 0.1 millimeters.

Alternative Embodiment YY

The currency processing device according to any of alternative embodiments F, G, and H and the system according to any of alternative embodiments J and L, wherein the elongated strip of light has a first dimension and a second dimension, the first dimension being about 13 millimeters.

Alternative Embodiment ZZ

The currency processing device according to any of alternative embodiments F, G, and H and the system according to any of alternative embodiments J and L, wherein the elongated strip of light has a first dimension and a second dimension, the first dimension being about 0.5 inches.

Alternative Embodiment AAA

The currency processing device according to any of alternative embodiments F, G, and H and the system according to any of alternative embodiments J and L, wherein the elongated strip of light has a first dimension and a second dimension, the second dimension being about 0.3 millimeters.

Alternative Embodiment BBB

Embodiment BBB1

The currency processing device according to any of alternative embodiments F, G, and H and the system according to any of alternative embodiments I, J, K, and L, further comprising a waveguide, the waveguide having a first end, a second end, a first dimension, a second dimension, and a third dimension, wherein light generally propagates from the first end to second end of the waveguide in the third dimension, the second dimension being narrower that the first dimension to allow the light to expand in the first direction.

Embodiment BBB2

The currency processing device according to embodiment BBB1 and the system according to embodiment BB1, wherein the waveguide is formed from a sheet of plastic.

Embodiment BBB3

The currency processing device according to embodiment BBB1 and the system according to embodiment BB1, wherein the waveguide is formed from glass.

Alternative Embodiment CCC

Embodiment CCC1

According to some embodiments, a light distribution system that distributes light to any of the described sensor arrangements in alternative embodiments F, G, H, and to any of the sensing systems described in alternative embodiments I, J, K, L and M.

Embodiment CCC2

Any of the alternative embodiments of embodiment CCC1, wherein the light distribution system comprises: a slab waveguide having a first opposing end, a second opposing end, a first dimension, a second dimension, and a third dimension, the first and second opposing ends lying in planes along the first and second dimensions; a first light emitting diode coupled to the first opposing end of the slab waveguide such that substantially all of the light emitted from the first light emitting diode enters the first opposing end of the slab waveguide; a second light emitting diode coupled to the first opposing end of the slab waveguide and adjacent the first light emitting diode such that substantially all of the light emitted from the second light emitting diode enters the first opposing end of the slab waveguide; a plurality of optical fibers coupled to the second opposing end of the slab waveguide, the plurality of optical fibers configured to direct light; wherein the emitted light generally propagates from the first opposing end to the second opposing end of the slab waveguide in the third dimension, the third dimension being perpendicular to the planes along the first and second dimensions; the second dimension being narrower that the first dimension to allow the light to expand in the first dimension such that the plurality of optical fibers receive a substantially equivalent amount of light.

Each of these aspects, embodiments, and obvious variations thereof is contemplated as falling within the spirit and scope of the claimed invention, which is set forth in the following claims.

What is claimed is:

1. A currency processing device for receiving a stack of U.S. currency bills and rapidly processing all the bills in the stack, the device comprising:

an input receptacle positioned to receive a stack of U.S. currency bills of a plurality of denominations, the currency bills having a wide dimension and a narrow dimension;

a transport mechanism positioned to transport the bills, one at a time, in a transport direction from the input receptacle along a transport path at a rate of at least about 1000 bills per minute with the narrow dimension of the bills parallel to the transport direction;

a currency bill sensor arrangement positioned along the transport path, the currency bill sensor comprising:

i) a multi-wavelength light source configured to emit a first wavelength of light and a second wavelength of light in an alternating manner;

ii) a cylindrical lens positioned to receive the first and second wavelengths of light from the multi-wavelength light source, the cylindrical lens illuminating an elongated strip of light on a surface of one of the plurality of currency bills, the cylindrical lens being configured to receive light reflected from the surface of the one of the plurality of currency bills;

iii) a photodetector positioned to receive the reflected light, the photodetector generating an electrical signal in response to the received reflected light;

iv) a processor configured to receive the electrical signal generated by the photodetector;

wherein, the processor is configured to determine whether the surface of the one of the plurality of currency bills is a primary surface or a secondary surface based on the electrical signal.

2. The currency processing device of claim 1, further comprising a controller configured to modulate the first and second wavelengths of light on and off in the alternating manner.

3. The currency processing device of claim 1, wherein the first and second wavelengths of light are visible light.

4. The currency processing device of claim 1, further comprising one or more output receptacles positioned to receive currency bills from the transport mechanism after the currency bills pass the currency bill sensor arrangement.

5. The currency bill sensor arrangement of claim 1, wherein the processor is further configured to denominate the plurality of currency bills based on information associated with the electrical signal at a rate in excess of 1000 bills per minute.

6. The currency bill sensing system of claim 1, wherein the processor is further configured to determine a series of the currency bills based on information associated with the electrical signal.

7. The currency bill sensing system of claim 1, wherein the first wavelength of light is between about 520 nanometers and 580 nanometers, and wherein the second wavelength of light is between about 605 nanometers and 665 nanometers.

8. The currency bill sensing system of claim 1, wherein the first wavelength of light is between about 520 nanometers and 580 nanometers, and wherein the second wavelength of light is between about 420 nanometers and 480 nanometers.

9. The currency bill sensing system of claim 1, wherein the multi-wavelength light source is further configured to emit a third wavelength of light, and wherein the first wavelength of light is red light, the second wavelength of light is green light, the third wavelength of light is blue light.

10. A U.S. currency processing device for receiving a stack of U.S. currency bills and rapidly processing all the bills in the stack, the device comprising:

an input receptacle positioned to receive a stack of U.S. bills of a plurality of denominations, the bills having a narrow dimension and a wide dimension;

a transport mechanism comprising a transport drive motor and transport rollers, the transport mechanism being positioned to transport the bills, one at a time, from the input receptacle along a transport path in a transport direction;

a currency bill sensor arrangement positioned along the transport path, the currency bill sensor comprising:

i) a first light source;

ii) a second light source;

iii) a controller configured to modulate the first and second light sources on and off in an alternating manner;

iv) a cylindrical lens positioned to receive modulated light from the first and second light sources, the cylindrical lens having light focusing characteristics in one direction that illuminates an elongated strip of the modulated light onto a surface of one of the plurality of currency bills, the cylindrical lens being positioned to receive modulated light reflected from the surface of the currency bill;

v) a photodetector positioned to receive the reflected modulated light from the cylindrical lens, the photodetector generating an electrical signal in response to the received reflected modulated light;

vi) a processor configured to receive the electrical signal generated by the photodetector;

wherein, the processor is configured to determine whether the surface of the one of the plurality of currency bills is a primary surface or a secondary surface based on the electrical signal.

11. The currency processing device of claim 10, wherein the transport mechanism is adapted to transport the bills at a rate in excess of 500 bills per minute with their narrow dimension parallel to the transport direction.

12. The currency bill sensor arrangement of claim 10, wherein the processor is further configured to denominate the plurality of currency bills based on the electrical signal at a rate in excess of 1500 bills per minute.

13. The currency bill sensing system of claim 10, wherein the processor is further configured to determine a series of the currency bills based on information associated with the electrical signal at a rate in excess of 1500 bills per minute.

14. A currency processing device, comprising:

an input receptacle configured to receive a stack of currency bills;

a transport mechanism configured to move the currency bills in a serial manner along a transport path;

a currency bill sensor arrangement positioned along the transport path, the currency bill sensor comprising:

i) a multi-wavelength light source configured to emit a first wavelength of light and a second wavelength of light in an alternating manner;

ii) a cylindrical lens positioned adjacent the transport path and is configured to receive the first and second wavelengths of light from the multi-wavelength light source, the cylindrical lens illuminating an elongated strip of light on a surface of each of the plurality of currency bills, the cylindrical lens being configured to receive light reflected from the surfaces of the plurality of currency bills;

iii) a photodetector positioned to receive the reflected light, the photodetector generating an electrical signal in response to the received reflected light; and iv) a processor configured to receive the electrical signal generated by the photodetector;

wherein, the processor is configured to determine whether a surface of each of the currency bills is a primary surface or a secondary surface based on the electrical signal.

15. The currency processing device of claim 14, wherein the transport mechanism moves the currency bills along the transport path at a rate of at least about 1000 bills per minute and wherein the processor is configured to determine a face-orientation of the bills at a rate of at least 1000 bills per minute.

16. The currency processing device of claim 15, wherein the processor is further configured to denominate the bills at a rate of 1000 bills per minute.

17. The currency processing device of claim 14, further comprising a controller configured to modulate the first and second wavelengths of light on and off in the alternating manner.

18. The currency bill sensing system of claim 14, wherein the multi-wavelength light source is further configured to emit a third wavelength of light, and wherein the first wavelength of light is red light, the second wavelength of light is green light, the third wavelength of light is blue light.

19. A currency bill sensor arrangement, the sensor comprising:

a first light source;

a second light source;

a controller configured to modulate the first and second light sources on and off in an alternating manner;

a cylindrical lens positioned to receive modulated light from the first and second light sources, the cylindrical lens directing the modulated light onto a surface of a currency bill having two opposing surfaces including a primary surface and a secondary surface, the cylindrical lens being positioned to receive modulated light reflected from the currency bill;

a photodetector positioned to receive the reflected modulated light from the cylindrical lens, the photodetector generating an electrical signal in response to the received reflected modulated light; and a processor configured to receive the electrical signal generated by the photodetector;

wherein the processor is configured to determine whether the surface of the currency bill is the primary surface or the secondary surface based on the electrical signal.

20. The currency bill sensor arrangement of claim 19, wherein the first and second light sources are LED light sources.

21. The currency bill sensor arrangement of claim 19, wherein the first light source emits a first wavelength of light and the second light source emits a second wavelength of light.

22. The currency bill sensor arrangement of claim 21, wherein the processor is further configured to split the electrical signal into a first wavelength component and a second wavelength component, the processor being configured to denominate the currency bill based on at least one of the first wavelength component, the second wavelength component, or an average of the first and second wavelength components.

23. The currency bill sensor arrangement of claim 21, wherein the processor is further configured to filter the electrical signal to produce an average reflectance signal, the processor being configured to denominate the currency bill based on the average reflectance signal.

24. The currency bill sensor arrangement of claim 21, wherein the processor is further configured to split the electrical signal into a first wavelength reflectance component and a second wavelength reflectance component, the processor configured to determine the difference signal between the first wavelength reflectance component and the second wavelength reflectance component to be used in determining whether the surface of the currency bill is the primary surface or the secondary surface.

25. The currency bill sensor arrangement of claim 21, wherein the processor is further configured to split the electrical signal into a first wavelength reflectance component and a second wavelength reflectance component, the processor configured to determine the difference signal between the first wavelength reflectance component and the second wavelength reflectance component to be used in determining a series of the currency bill.

26. The currency bill sensor arrangement of claim 25, wherein the processor is configured to determine the series of the currency bill using the difference signal divided by an average reflectance signal.

27. The currency bill sensor arrangement of claim 19, wherein the cylindrical lens has a diameter between about 2 and 8 millimeters.

28. The currency bill sensor arrangement of claim 19, wherein the cylindrical lens has a diameter between about 3 and 6 millimeters.

29. The currency bill sensor arrangement of claim 19, wherein the cylindrical lens has a diameter of about 5 millimeters.

30. The currency bill sensor arrangement of claim 19, wherein the cylindrical lens has a diameter of about 3.8 millimeters.

* * * * *